United States Patent
Nakata et al.

(10) Patent No.: US 11,526,214 B2
(45) Date of Patent: Dec. 13, 2022

(54) DETECTING A POSITIONAL RELATIONSHIP BETWEEN AN INFORMATION PROCESSING DEVICE AND AN EXTERNAL KEYBOARD

(71) Applicant: LENOVO (Singapore) PTE. LTD., New Tech Park (SG)

(72) Inventors: Munefumi Nakata, Yokohama (JP); Yasumichi Tsukamoto, Yokohama (JP); Daisuke Watanabe, Yokohama (JP)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 133 days.

(21) Appl. No.: 16/933,273

(22) Filed: Jul. 20, 2020

(65) Prior Publication Data
US 2021/0018989 A1    Jan. 21, 2021

(30) Foreign Application Priority Data
Jul. 19, 2019   (JP) .............................. JP2019-133571

(51) Int. Cl.
*G06F 3/023* (2006.01)
*H04B 5/00* (2006.01)

(52) U.S. Cl.
CPC ......... *G06F 3/0231* (2013.01); *H04B 5/0037* (2013.01); *H04B 5/0081* (2013.01)

(58) Field of Classification Search
None
See application file for complete search history.

(56) References Cited

U.S. PATENT DOCUMENTS

| | | | |
|---|---|---|---|
| 2004/0056781 A1* | 3/2004 | Rix | G06F 3/0202 341/20 |
| 2010/0039064 A1 | 2/2010 | Locker et al. | |
| 2010/0039387 A1 | 2/2010 | Locker et al. | |

(Continued)

FOREIGN PATENT DOCUMENTS

| | | |
|---|---|---|
| CN | 108919966 A | 11/2018 |
| JP | 2002149289 A | 5/2002 |
| JP | 2004038332 A | 2/2004 |

(Continued)

*Primary Examiner* — Matthew Yeung
(74) *Attorney, Agent, or Firm* — Kunzler Bean & Adamson

(57) ABSTRACT

Systems that detect a positional relationship between an informal processing device and an external keyboard are disclosed. A system includes an external keyboard including a first communication unit, an incoming coil disposed inside thereof, and an input controller configured to control the first communication unit to transmit operating information indicating an input operation from a user, information processing device including a second communication unit configured to communicate with the first communication unit, a planar portion on which the keyboard is mountable, and a feeding coil disposed below the planar portion, the feeding coil configured to supply electricity to the incoming coil by an electromagnetically induced coupling, and a position detector configured to detect a positional relationship between the planar portion and the keyboard based on a coupling strength of the electromagnetically induced coupling between the feeding coil and the incoming coil. Similar apparatus and methods are also provided.

20 Claims, 13 Drawing Sheets

(56) References Cited

U.S. PATENT DOCUMENTS

2015/0002457 A1* 1/2015 Woo .................. G06F 3/0416
345/174
2016/0026271 A1* 1/2016 Yao .................. G06F 3/04162
345/173

FOREIGN PATENT DOCUMENTS

| JP | 2008061208 A | 3/2008 |
| JP | 2008129965 A | 6/2008 |
| JP | 2010239690 A | 10/2010 |
| JP | 2014050271 A | 3/2014 |
| JP | 2014139778 A | 7/2014 |
| JP | 2019097292 A | 6/2019 |

* cited by examiner

DETECTING A POSITIONAL RELATIONSHIP BETWEEN AN INFORMATION PROCESSING DEVICE AND AN EXTERNAL KEYBOARD

REFERENCE TO RELATED APPLICATION

This application claims priority to Japanese Patent Application No. JP2019-133571, filed on Jul. 19, 2019, the contents of which are incorporated herein by reference, in their entirety.

FIELD

The subject matter disclosed herein relates to computing systems and devices and, more particularly, relates to systems, apparatus, and methods for detecting a positional relationship between an informal processing device and an external keyboard.

BACKGROUND

Conventional information processing systems typically include an information processing device and a wireless external keyboard operating as an input device of the information processing device (see, e.g., Japanese Unexamined Patent Application Publication No. 2002-149289). The position of the external keyboard relative to such an information processing device can be freely changed for use.

An information processing device in some information processing systems may include, for example, a foldable display unit. A user may use such an information processing device while placing an external keyboard over the display unit; however, a more flexible input/output control may be demanded.

BRIEF SUMMARY

Various embodiments provide systems and apparatus that can detect a positional relationship between an informal processing device and an external keyboard. One system includes an external keyboard including a first communication unit, an incoming coil disposed inside thereof, and an input controller configured to control the first communication unit to transmit operating information indicating an input operation from a user, information processing device including a second communication unit configured to communicate with the first communication unit, a planar portion on which the keyboard is mountable, and a feeding coil disposed below the planar portion, the feeding coil configured to supply electricity to the incoming coil by an electromagnetically induced coupling, and a position detector configured to detect a positional relationship between the planar portion and the keyboard based on a coupling strength of the electromagnetically induced coupling between the feeding coil and the incoming coil.

An apparatus includes a processor of an information handling device and a memory configured to store code executable by the processor. The executable code causes the processor to communicate with an external keyboard including an incoming coil and receiving an input operation from a user, supply electricity to the incoming coil by electromagnetically induced coupling, detect a positional relationship between a display unit and the keyboard based on a coupling strength of the electromagnetically induced coupling between a feeding coil and the incoming coil, and change a display area of the display unit according to the positional relationship with the keyboard.

Other embodiments provide methods for detecting a positional relationship between an informal processing device and an external keyboard. One method includes communicating, by a processor of an information handling device, with an external keyboard including an incoming coil and receiving an input operation from a user, supplying electricity to the incoming coil by electromagnetically induced coupling, detecting a positional relationship between a display unit and the keyboard based on a coupling strength of the electromagnetically induced coupling between a feeding coil and the incoming coil, and changing a display area of the display unit according to the positional relationship with the keyboard.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
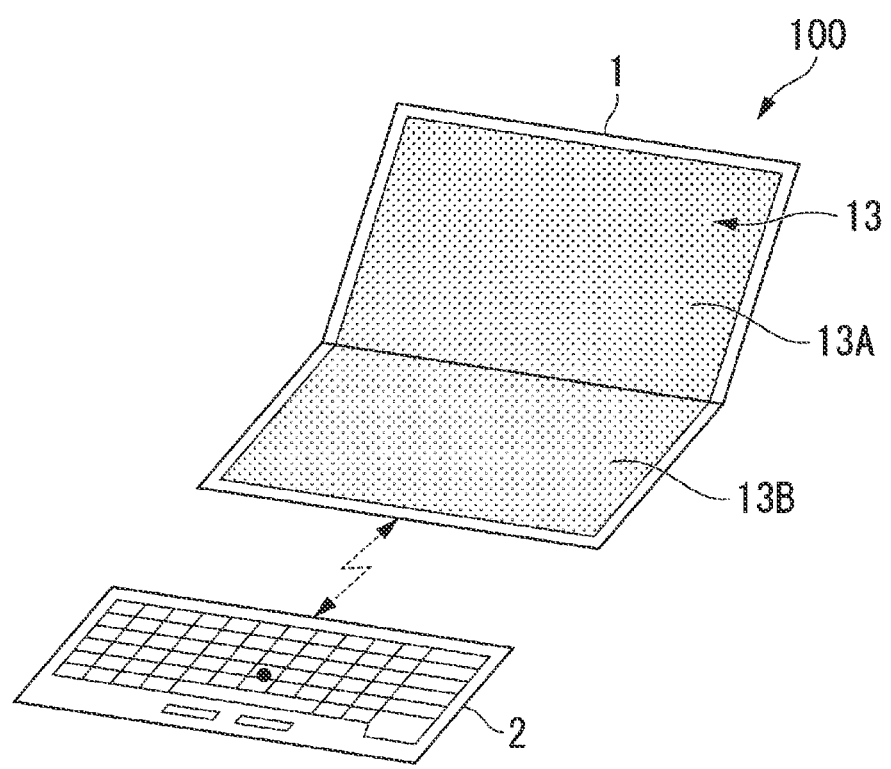
FIG. 1 is a schematic diagram illustrating one embodiment of an information processing system.

As will be appreciated by one skilled in the art, aspects of the embodiments may be embodied as an apparatus and/or a system. Accordingly, embodiments may take the form of an entirely hardware embodiment or an embodiment combining hardware and software aspects that may all generally be referred to herein as a "circuit," "module" or "system."

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present technology has been conceived in view of the issues discussed above in the background section and provides an information processing system, an information processing device, a keyboard, and a method for detecting a keyboard position, which are capable of implementing more flexible input/output control according to the positional relationship between the keyboard and the information processing device.

An information processing system according to one embodiment includes an external keyboard including a first communication unit, an incoming coil disposed inside thereof, and an input controller configured to control the first communication unit to transmit operating information indicating an input operation from a user, an information processing device including a second communication unit configured to communicate with the first communication unit, a planar portion on which the keyboard is mountable, and a feeding coil disposed below the planar portion. In certain embodiments, the feeding coil is configured to supply electricity to the incoming coil by an electromagnetically induced coupling. In some embodiments, the information processing system further includes a position detector configured to detect a positional relationship between the planar portion and the keyboard based on a coupling strength of the electromagnetically induced coupling between the feeding coil and the incoming coil.

In some embodiments, the keyboard may include a storage unit configured to store electricity received by the incoming coil and supply operating electricity to operate the keyboard. In additional or alternative embodiments, the planar portion may have a display unit and the display unit can include a display area that is controlled by a display controller. Here, the display controller may be configured to change the display area according to a positional relationship between the planar portion and the keyboard.

The information processing system according to certain embodiments may further include a coupling-strength generator configured to generate an index value indicating the coupling strength based on a feeding voltage that is a voltage across the feeding coil and an incoming voltage that is a voltage across the incoming coil. Here, the position detector may detect a positional relationship between the planar portion and the keyboard based on the index value indicating the coupling strength generated by the coupling-strength generator.

In additional or alternative embodiments, the keyboard may include the coupling-strength generator, the information processing device may include the position detector, and the position detector may detect a positional relationship between the planar portion and the keyboard based on an index value indicating the coupling strength acquired from the keyboard. In further additional or alternative embodiments, the keyboard may include the coupling-strength generator and the position detector, and the display controller may change the display area according to a positional relationship with the keyboard acquired from the keyboard.

In some embodiments, the information processing device may include the coupling-strength generator and the position detector, and the coupling-strength generator may generate an index value indicating the coupling strength based on the feeding voltage and the incoming voltage acquired from the keyboard. In additional or alternative embodiments, the feeding coil may include a plurality of sub-coils, the plurality of sub-coils may be aligned in a particular direction to detect a position of the keyboard on the planar portion in plan view and may be disposed so as to generate magnetic flux in a same direction, and the incoming coil may have a predetermined coil width in the detection direction corresponding to the width of the keyboard in the detection direction in plan view.

In various embodiments, the detection direction may include a first detection direction and a second detection direction orthogonal to each other in a plan view of the keyboard and the feeding coil may include a first feeding coil in which the plurality of sub-coils are arranged in the first detection direction and a second feeding coil in which the plurality of sub-coils is arranged in the second detection direction. The incoming coil may include a first incoming coil corresponding to the first detection direction and a second incoming coil corresponding to the second detection direction and the position detector may detect a position of the keyboard in the first detection direction based on the coupling strength between the first feeding coil and the first incoming coil and a position of the keyboard in the second detection direction based on the coupling strength between the second feeding coil and the second incoming coil.

In additional or alternative embodiments, the incoming coil may include a first incoming coil including a triangular shape with a base perpendicular to a detection direction to detect a position of the keyboard on the planar portion in plan view and a second incoming coil that is a reverse triangular coil corresponding to the first incoming coil that is point-symmetrically reversed. The first incoming coil and the second incoming coil may be disposed thereon so that movement of the keyboard in the detection direction increases the coupling strength between the feeding coil and the first incoming coil while decreasing the coupling strength between the feeding coil and the second incoming coil.

In further additional or alternative embodiments, the information processing device includes a communication unit configured to communicate with an external keyboard including an incoming coil and is configured to receive an input operation from a user. The information processing device further includes a feeding coil configured to supply electricity to the incoming coil by electromagnetically induced coupling, a position detector configured to detect a positional relationship between a display unit and the keyboard based on a coupling strength of an electromagnetically induced coupling between the feeding coil and the incoming coil, and a display controller configured to change a display area of the display unit according to the positional relationship with the keyboard.

A keyboard, in various embodiments, is configured to transmit operating information indicating an input operation received from a user to an information processing device. The information processing device, in some embodiments, includes a feeding coil configured to supply electricity to an incoming coil by electromagnetically induced coupling and a display controller configured to change a display area of a display unit according to a positional relationship with an external keyboard. In certain embodiments, the keyboard includes a communication unit configured to communicate with the information processing device. In various embodiments, the incoming coil is configured to receive electricity/power from the feeding coil by an electromagnetically induced coupling, an input controller is configured to control the communication unit to transmit operation information indicating an input operation received from the user, and a position detector is configured to detect a positional relationship between the display unit and the keyboard based on a coupling strength of an electromagnetically induced coupling between the feeding coil and the incoming coil.

Various embodiments also provide methods for detecting a keyboard position relative to an information processing device in which the information processing device includes a planar portion on which an external keyboard is mountable and a feeding coil disposed below the planar portion and configured to supply electricity to an incoming coil by an electromagnetically induced coupling, the keyboard including an incoming coil and being configured to transmit operating information indicating an input operation received from a user to the information processing device. In some embodiments, the method includes supplying, via a feeding coil, electricity to an incoming coil and detecting, a position detector, a positional relationship between a planar portion and a keyboard based on a coupling strength of an electromagnetically induced coupling between the feeding coil and the incoming coil.

Figure 2:
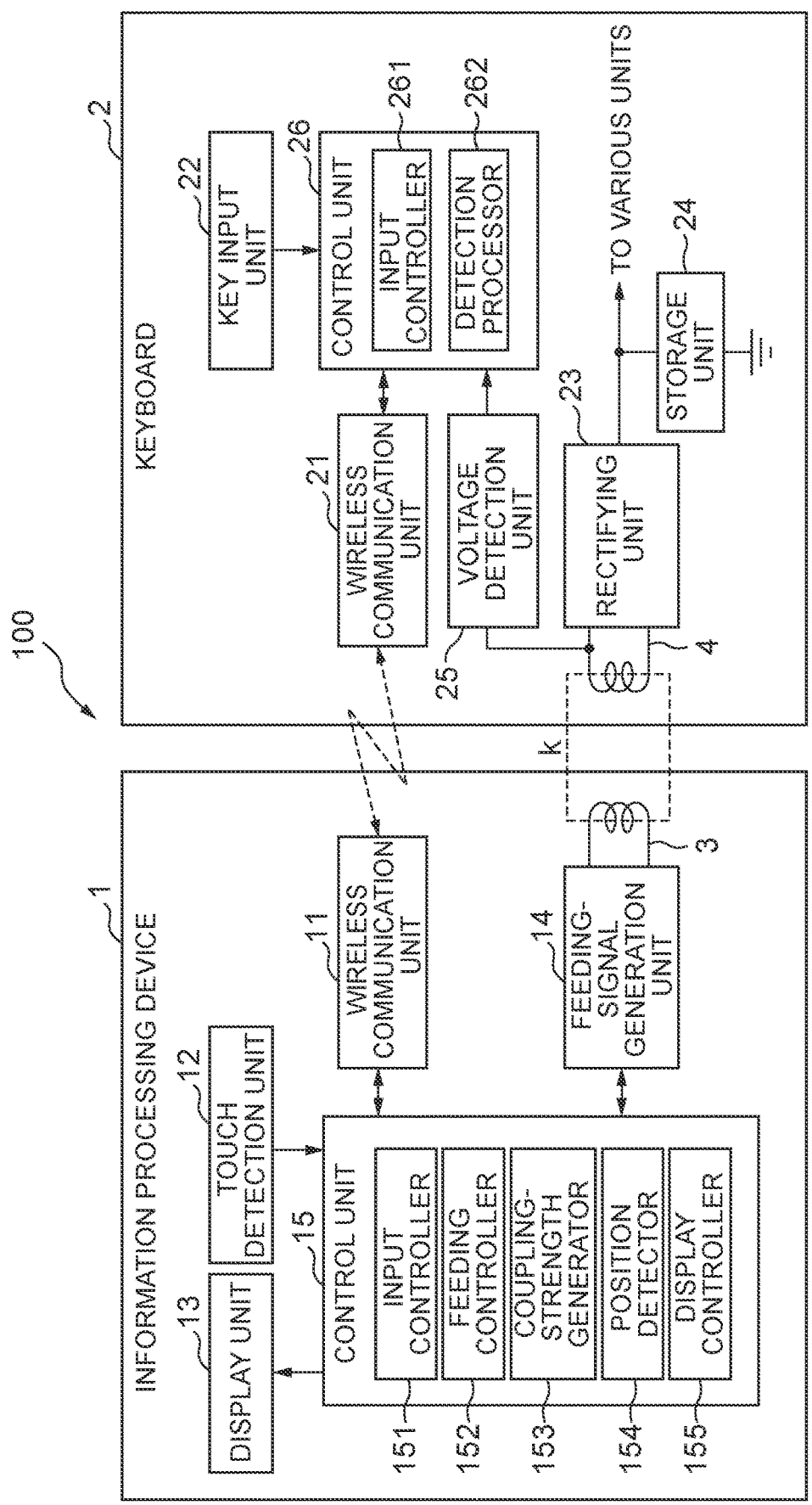
FIG. 2 is a functional block diagram of the information processing system of FIG. 1.

The following describes an information processing system, an information processing device, and a keyboard according to various embodiments. Referring to the drawings, FIG. 1 shows one example of the configuration of an information processing system 100 according to one embodiment. FIG. 2 is a functional block diagram showing an example of the information processing system 100 according to one embodiment.

As shown in FIG. 1 and FIG. 2, the information processing system 100 includes an information processing device 1 and an external keyboard 2. In one embodiment, the information processing device 1 and the keyboard 2 are connected by wireless communication.

The information processing device 1, in various embodiments, includes a laptop personal computer (laptop PC) or a tablet terminal. The information processing device 1 wirelessly communicates with the keyboard 2, which includes an external physical keyboard configured to receive operating information from the information processing device 1.

In various embodiments, the information processing device 1 includes, among other components, a wireless communication unit 11, a touch detection unit 12, a display unit 13, a feeding-signal generation unit 14, a control unit 15, and a feeding coil 3. The wireless communication unit 11 (an example of a second communication unit) wirelessly communicates with the keyboard 2 by Bluetooth®, for example. The wireless communication unit 11 is configured to receive operating information from the keyboard 2 and outputs the operating information to the control unit 15.

In certain embodiments, the touch detection unit 12 includes a touch panel or a touch sensor and overlaps with the display unit 13. The touch detection unit 12 is configured to detect a touch operation to the display unit 13.

In one embodiment, the display unit 13 (an example of a planar portion) includes an organic Electro-Luminescence (EL) display and is configured to display various types of information and/or data on the display screen. The display unit 13 is foldable and includes a main screen area 13A and an area 13B that can operate as a virtual input device.

The feeding-signal generation unit 14 is configured to generate an alternating current (AC) signal (e.g., a sine-wave signal) that is supplied to the feeding coil 3 from the electricity supplied from a power supply, such as an AC adapter (not shown) or a battery (not shown). The generated AC signal is used for supplying electricity to operate the keyboard 2, supplying charging electricity to a storage unit 24, and detecting the position of the keyboard 2.

In various embodiments, the feeding-signal generation unit 14 is configured to acquire the feeding voltage, which is a set or a measured voltage of the feeding coil 3. The feeding-signal generation unit 14, in certain embodiments, outputs the feeding voltage in response to the request from the control unit 15.

The feeding coil 3 supplies electricity to an incoming coil 4 of the keyboard 2 via an electromagnetically induced coupling and receives the AC signal generated by the feeding-signal generation unit 14. In one embodiment, as shown in FIG. 3, the feeding coil 3 is disposed within the area 13B of the display unit 13.

Figure 3:
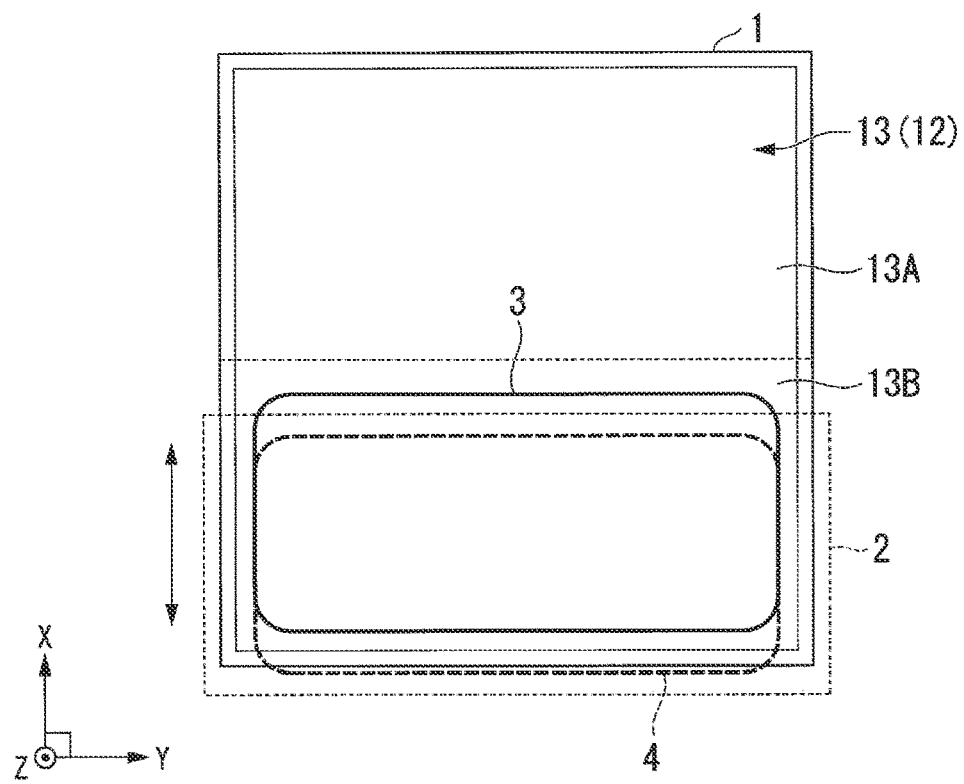
FIG. 3 is a diagram of one embodiment of a feeding coil and an incoming coil included in the information processing system of FIG. 1.

FIG. 3 shows the arrangement of the feeding coil 3 and the incoming coil 4 in accordance with one embodiment. In the following description, the vertical direction of the area 13B (or the transverse direction (short-side direction) of the keyboard 2) is called the X-axis direction, the lateral direction of the area 13B (or the longitudinal direction (long-side direction) of the keyboard 2) is called the Y-axis direction, and the thickness direction of the information processing device 1 (or the thickness direction of the keyboard 2) is called the Z-axis direction.

In the embodiment shown in FIG. 3, the feeding coil 3 is formed with one coil. The feeding coil 3 is disposed within the area 13B so that magnetic flux is generated over substantially the entire area 13B in the thickness direction (e.g., the Z-axis direction) of the information processing device 1.

In certain embodiments, the control unit 15 includes a processor including a Central Processing Unit (CPU) and executes various types of arithmetic processing in accordance with programs to control the information processing device 1 as a whole. The control unit 15 includes, among other components, an input controller 151, a feeding controller 152, a coupling-strength generator 153, a position detector 154, and a display controller 155.

The input controller 151, in some embodiments, is configured to control the touch detection unit 12 and acquire various types of input information based on the operating information acquired from the touch detection unit 12. In one embodiment, when the external keyboard 2 is not connected, the input controller 151 controls an image of an input device, such as a virtual keyboard, a touch pad, or a pen drawing tablet, displayed as a virtual input device on the area 13B of the display unit 13 to acquire information input to such an input device. In additional or alternative embodiments, when the external keyboard 2 is connected, the input controller 151 acquires the input information from the keyboard 2 via the wireless communication unit 11.

The input information acquired by the input controller 151 is used for various types of processing by the control unit 15. The feeding controller 152 is configured to control the feeding-signal generation unit 14 to supply an AC signal to the feeding coil 3 and to supply electricity to the incoming coil 4 of the keyboard 2 by an electromagnetically induced coupling.

The coupling-strength generator 153 is configured to generate an index value (e.g., a coupling coefficient k) indicating the coupling strength of the electromagnetically induced coupling that is used to detect the positional relationship between the information processing device 1 (display unit 13) and the keyboard 2. The coupling-strength generator 153 is configured to generate the coupling coefficient k based on the feeding voltage acquired from the feeding-signal generation unit 14 and the incoming voltage that is the voltage across the incoming coil 4 acquired from the keyboard 2 via the wireless communication unit 11. In some embodiments in which the feeding voltage is represented as V1 and the incoming voltage as V2, the coupling-strength generator 153 may use the voltage ratio (V2/V1) between the feeding voltage V1 and the incoming voltage V2 as a substitute for the coupling coefficient k.

Figure 4:
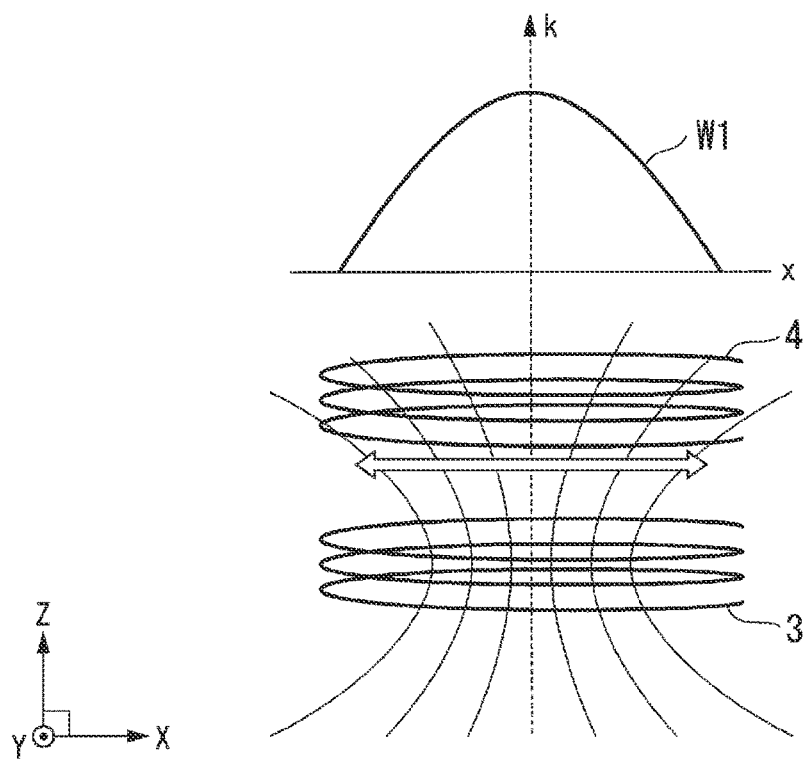
FIG. 4 is a schematic diagram illustrating one embodiment of the relationship between a keyboard position and the coupling coefficient in the information processing system of FIG. 1.

The position detector 154, in various embodiments, is configured to detect the positional relationship between the display unit 13 and the keyboard 2 based on the coupling strength (e.g., coupling coefficient k) of the electromagnetically induced coupling between the feeding coil 3 and the incoming coil 4. Note that, as shown in FIG. 4, the coupling strength (for example, coupling coefficient k) changes with the positional relationship between the feeding coil 3 and the incoming coil 4. Here, the positional relationship between the feeding coil 3 and the incoming coil 4 directly corresponds to the positional relationship between the display unit 13 (area 13B) of the information processing device 1 and the keyboard 2.

FIG. 4 shows one embodiment of the relationship between the position of the keyboard 2 and the coupling coefficient k. The graph of FIG. 4 shows a change of the coupling coefficient k between the feeding coil 3 and the incoming coil 4 when the position of the keyboard 2 changes in the X-axis direction (detection direction) on the display screen of the display unit 13 (area 13B). The waveform W1 shows the characteristics of the coupling coefficient k.

As shown in the waveform W1 of FIG. 4, the coupling coefficient k becomes maximum when the center of the feeding coil 3 coincides with the center of the incoming coil 4. As the keyboard 2 moves in the X-axis direction to increase a deviation of the incoming coil 4 relative to the corresponding feeding coil 3, the coupling coefficient k decreases. The position detector 154 then detects the positional relationship between the display unit 13 and the keyboard 2 based on such a characteristic of the coupling coefficient k that changes with the positional relationship between the feeding coil 3 and the incoming coil 4 as shown in FIG. 4.

In various embodiments, the display controller 155 is configured to control the display unit 13 to display various types of information and images on the display unit 13. The display controller 155 also changes the display area of the display unit 13 according to the positional relationship between the display unit 13 and the keyboard 2.

Figure 5:
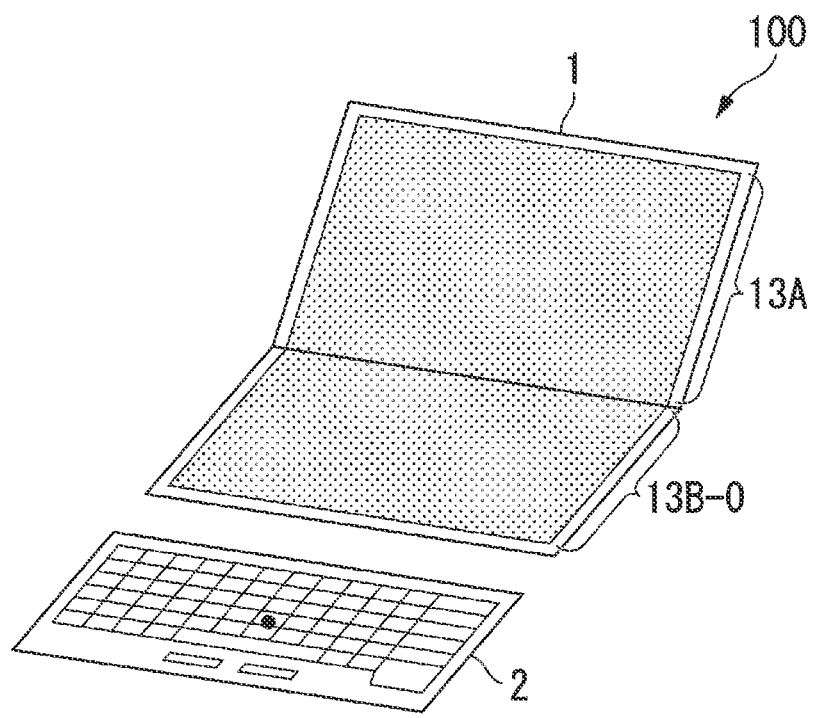
FIG. 5 is a schematic diagram illustrating the one embodiment of the relationship between a keyboard position and the control of a display screen in the information processing system of FIG. 1.
Figure 6:
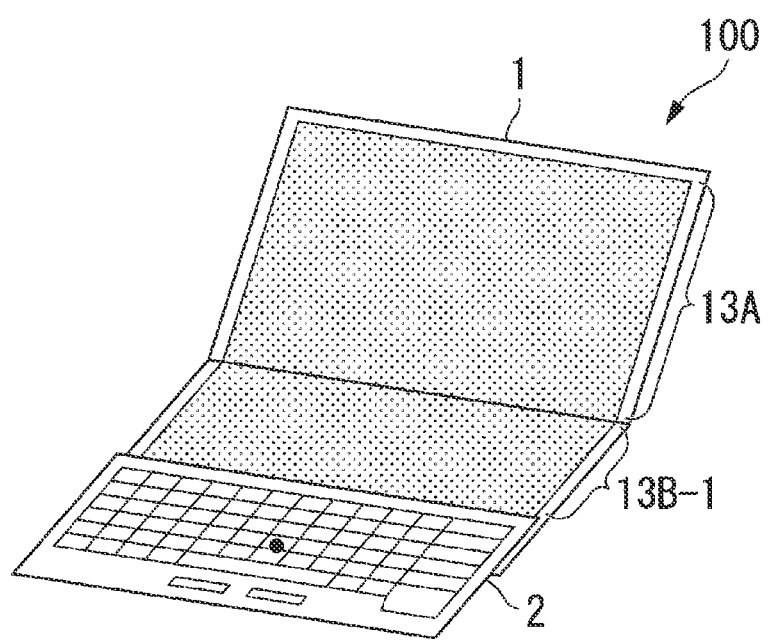
FIG. 6 is a schematic diagram illustrating another embodiment of the relationship between a keyboard position and the control of a display screen in the information processing system of FIG. 1.
Figure 7:
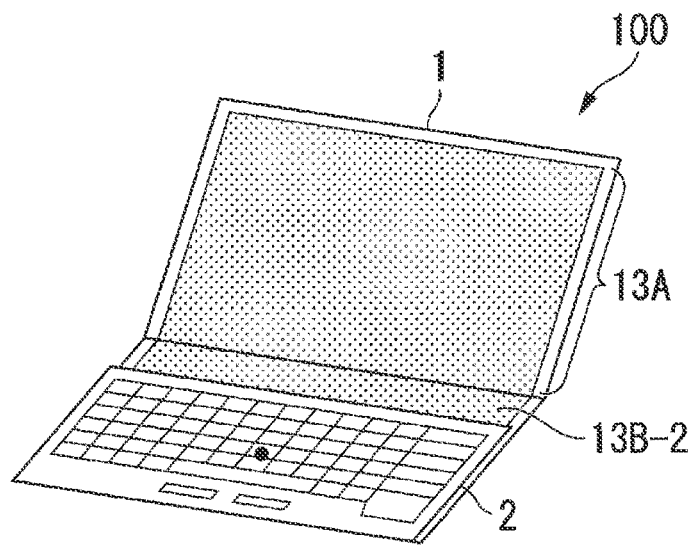
FIG. 7 is a schematic diagram illustrating yet another embodiment of the relationship between a keyboard position and the control of a display screen in the information processing system of FIG. 1.

Referring now to FIGS. 5 through 7, the following describes processing by the display controller 155 to change the display area of the display unit 13. Specifically, FIGS. 5 through 7 show the relationship between the position of the keyboard 2 and the control of the display screen in this embodiment.

FIG. 5 shows the case where the display area of the information processing device 1 and the keyboard 2 do not overlap at all. In this case, the display controller 155 displays an image on the display area that is the entire screen including the area 13A of the main screen and the area 13B-0.

FIG. 6 shows the case where the keyboard 2 overlaps with about a half of the area 13B in the X-axis direction. In this case, the display controller 155 displays an image on the display area including the area 13A of the main screen and an area 13B-1 as a part of the area 13B.

FIG. 7 shows the case where the keyboard 2 overlaps with substantially the entire surface of the area 13B. In this case, the display controller 155 displays an image on the display area including the area 13A of the main screen and an area 13B-2 as a part of the area 13B.

The keyboard 2 is an external input device that is connectable to the information processing device 1 by wireless communication. The keyboard 2 includes, among other components, a wireless communication unit 21, a key input unit 22, a rectifying unit 23, a storage unit 24, a voltage detection unit 25, a control unit 26, and the incoming coil 4.

The wireless communication unit 21 (an example of a first communication unit) communicates with the information processing device 1 (e.g., the wireless communication unit 11 described above) by wireless communication, such as Bluetooth®. In one embodiment, under the control of the control unit 15, the wireless communication unit 21 transmits the operating information received by the key input unit 22 to the information processing device 1 as input information. The wireless communication unit 21 also transmits an incoming voltage value to the information processing device 1 and the incoming voltage value indicates the incoming voltage across the incoming coil 4 detected by the voltage detection unit 25, as described elsewhere herein.

In various embodiments, the key input unit 22 includes a key switch or a pointing device, such as a touch pad. The key input unit 22 is configured to receive an input operation from a user and output operating information indicating the received input operation to the control unit 26.

The incoming coil 4, in certain embodiments, is configured to receive electricity from the feeding coil 3 by an electromagnetically induced coupling and output an AC signal of the incoming voltage according to the above-described coupling coefficient k that changes with the position of the keyboard 2. In one embodiment, as shown in FIG. 3, the incoming coil 4 is disposed inside of the keyboard 2. That is, the incoming coil 4 is mounted inside of the keyboard 2.

In the embodiment shown in FIG. 3, the incoming coil 4 is formed with one coil. The incoming coil 4 is disposed within the keyboard 2 so that magnetic flux is generated over substantially the entire face of the keyboard 2 in the thickness direction (e.g., the Z-axis direction) of the keyboard 2.

In some embodiments, the rectifying unit 23 includes a diode bridge circuit and changes the AC power generated in the incoming coil 4 by electromagnetic induction into DC power. The rectifying unit 23 then supplies the rectified DC power as operating power (e.g., power-supply electricity) to various units of the keyboard 2 and also supplies the DC power to the storage unit 24 as charging power.

The storage unit 24, in certain embodiments, includes a battery, such as a lithium secondary battery, and stores the charging power from the rectifying unit 23. The storage unit 24 also supplies the charged power to various units of the keyboard 2 as operating power to operate the keyboard 2. That is, the storage unit 24 stores the electricity received by the incoming coil 4 and supplies the operating power to operate the keyboard 2.

In certain embodiments, the voltage detection unit 25 includes an Analog-to-Digital Converter (ADC) and is configured to detect the incoming voltage that is the voltage across the incoming coil 4. The voltage detection unit 25 is configured to output an incoming voltage value indicating the detected incoming voltage to the control unit 26.

In some embodiments, the control unit 26 includes a processor including a CPU and is configured to control the keyboard 2 as a whole. The control unit 26 includes an input controller 261 and a detection processor 262.

The input controller 261, in various embodiments, is configured to control the wireless communication unit 21 to transmit operating information indicating the input operation received from the user. The input controller 261 is configured to acquire the operating information received by the key input unit 22 and transmit the acquired operating information as input information to the information processing device 1 via the wireless communication unit 21.

In some embodiments, when the feeding coil 3 feeds electricity (e.g., power) to the incoming coil 4, the detection processor 262 acquires the incoming voltage value detected by the voltage detection unit 25 and transmits the acquired incoming voltage value to the information processing device 1 via the wireless communication unit 21. The following describes the operation of the information processing system 100 according to the various embodiments.

Figure 8:
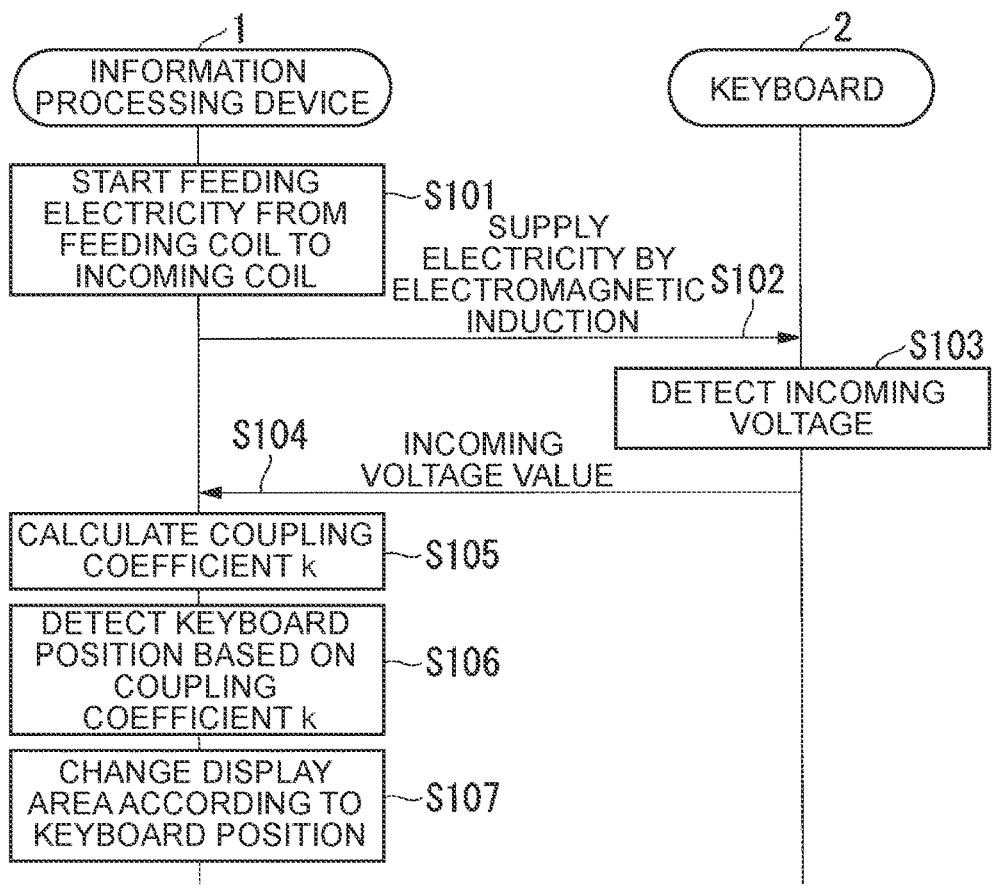
FIG. 8 is a schematic diagram illustrating one embodiment of position detection processing of a keyboard in the information processing system of FIG. 1.

FIG. 8 is a diagram showing an example of position detection processing for the keyboard 2 by the information processing system 100 according to various embodiments. As shown in FIG. 8, the information processing device 1 starts feeding electricity/power from the feeding coil 3 to the incoming coil 4 (block S101). The feeding controller 152 of the information processing device 1 controls the feeding-signal generation unit 14 to generate an AC signal and starts feeding electricity from the feeding coil 3.

The information processing device 1 supplies electricity via electromagnetic induction (block S102). The information processing device 1 feeds electricity from the feeding coil 3 to the incoming coil 4 of the keyboard 2. Next, the keyboard 2 detects the incoming voltage (block S103). The voltage detection unit 25 of the keyboard 2 detects the incoming voltage generated across the incoming coil 4 and outputs an incoming voltage value indicating the incoming voltage to the control unit 26.

subsequently, the keyboard 2 transmits the detected incoming voltage value to the information processing device 1 (block S104). The detection processor 262 of the control unit 26 acquires the incoming voltage value detected by the voltage detection unit 25 and transmits the acquired incoming voltage value to the information processing device 1 via the wireless communication unit 21. Under the control of the detection processor 262, the wireless communication unit 21 transmits the incoming voltage value to the wireless communication unit 11 of the information processing device 1 by wireless communication.

Further, the information processing device 1 calculates the coupling coefficient k (block S105). In one embodiment, the coupling-strength generator 153 of the information processing device 1 calculates the coupling coefficient k based on the feeding voltage V1 and the incoming voltage V2. Specifically, the coupling-strength generator 153 calculates the coupling coefficient k based on the voltage ratio (V2/V1) between the feeding voltage V1 and the incoming voltage V2.

In addition, the position detector 154 of the information processing device 1 detects the position of the keyboard 2 based on the coupling coefficient k (block S106). In certain embodiments, the position detector 154 detects the position of the keyboard 2 in the detection direction (e.g., the X-axis direction) on the area 13B of the display unit 13 based on the characteristic of the coupling coefficient k of the waveform W1 of FIG. 4.

Moreover, the display controller 155 of the information processing device 1 changes the display area according to the position of the keyboard 2 (block S107). In one embodiment, as shown in FIGS. 5 through 7, the display controller 155 changes the display area of the area 13B according to the position of the keyboard 2 in the detection direction (e.g., the X-axis direction) on the area 13B of the display unit 13.

Figure 9:
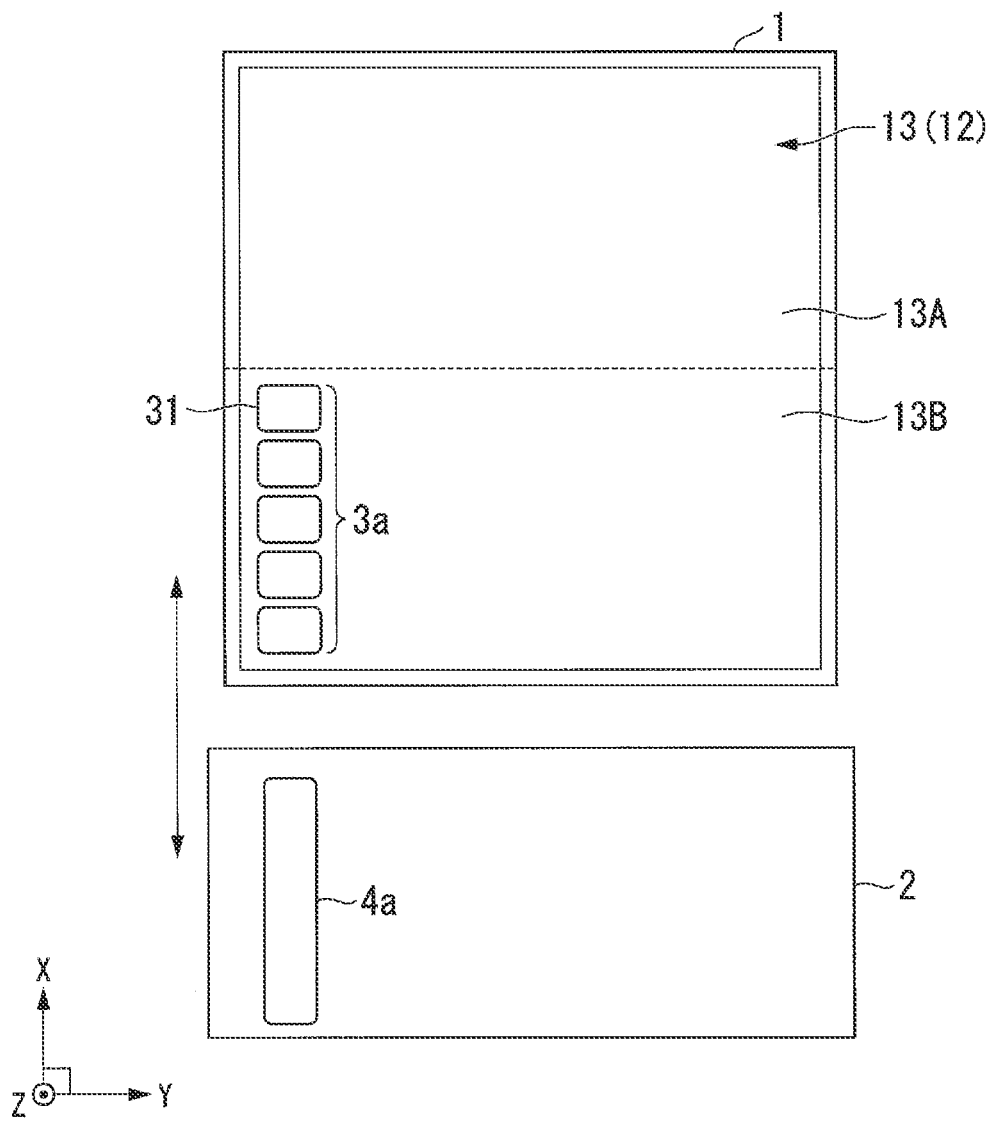
FIG. 9 is a diagram of one embodiment of the feeding coil and the incoming coil of FIG. 2.

Referring to FIGS. 9 through 12, the following describes modified examples of the shapes and arrangement of the feeding coil 3 and the incoming coil 4 in the various embodiments. FIG. 9 shows a first embodiment of the feeding coil 3 and the incoming coil 4. As shown in FIG. 9, the information processing device 1 includes, among other components, a feeding coil 3a and the keyboard 2 includes an incoming coil 4a.

The feeding coil 3a includes a plurality of sub-coils 31. The plurality of sub-coils 31 is aligned in the detection direction (e.g., the X-axis direction) to detect the position of the keyboard 2 on the display screen of the display unit 13 (on the area 13B) in a plan view and is disposed so that these sub-coils generate magnetic flux in the same direction. That is, as shown in FIG. 9, the sub-coils 31 are quadrangular coils wound in the same direction and are aligned in the X-axis direction.

The incoming coil 4a includes a predetermined coil width in the detection direction (e.g., the X-axis direction) corresponding to the width of the keyboard 2 in the detection direction in plan view. That is, the incoming coil 4a is a rectangular coil having a coil width substantially equal to the width of the keyboard 2 in the short-side direction (e.g., the X-axis direction) and is disposed at a position corresponding to the feeding coil 3a.

In certain embodiments, the feeding-signal generation unit 14 is configured to feed a generated AC signal to the feeding coil 3a including the plurality of sub-coils 31. Here, the coupling-strength generator 153 generates the coupling coefficient k between the feeding coil 3a and the incoming coil 4a and the position detector 154 detects the position of the keyboard 2 in the X-axis direction based on the coupling coefficient k.

Figure 10:
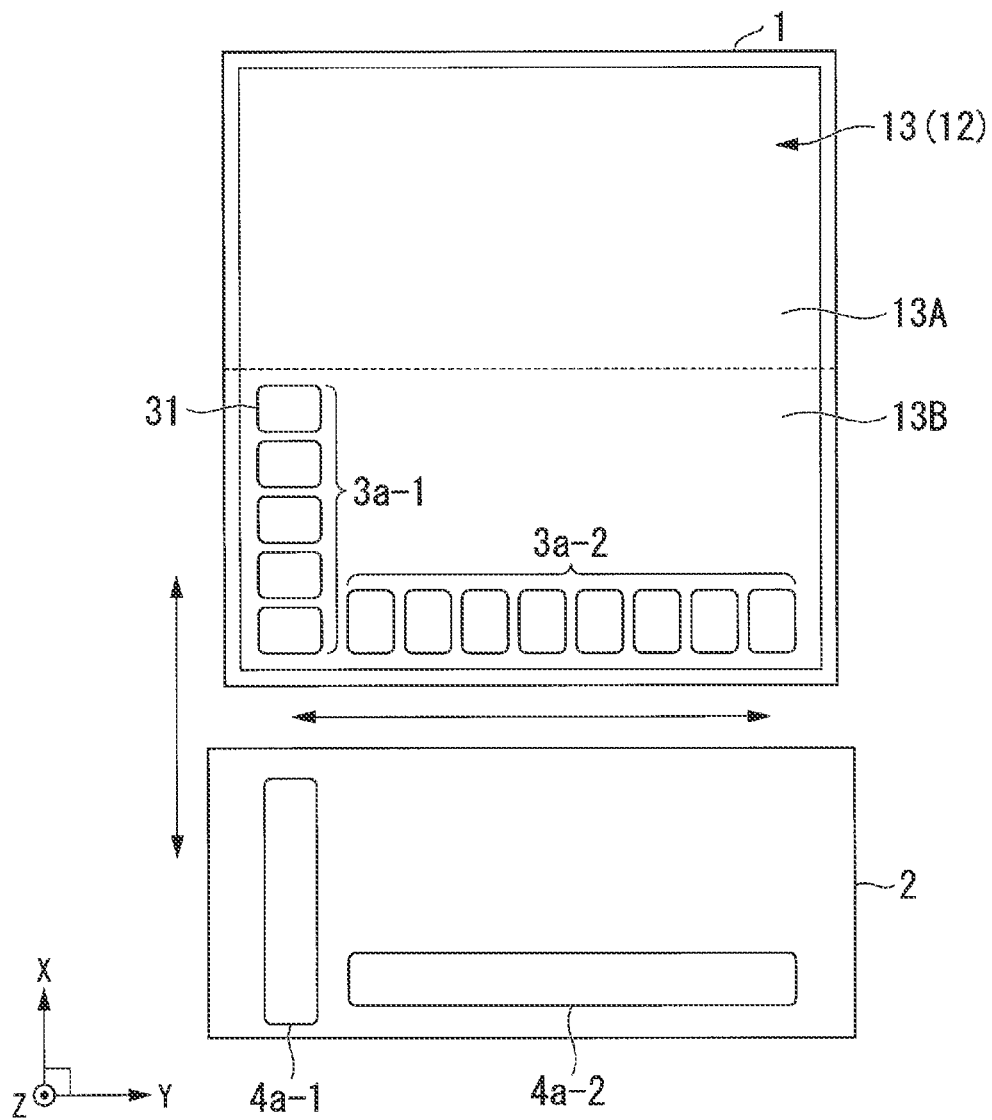
FIG. 10 is a diagram of another embodiment of the feeding coil and the incoming coil of FIG. 2.

FIG. 10 shows another embodiment of the feeding coil 3 and the incoming coil 4. As shown in FIG. 10, the information processing device 1 includes a feeding coil 3a-1 and a feeding coil 3a-2 and the keyboard 2 includes an incoming coil 4a-1 and an incoming coil 4a-2. The embodiment shown in FIG. 9 described above is adapted to detect a position in two detection directions, that is, a first detection direction (e.g., X-axis direction) and a second detection direction (e.g., the Y-axis direction).

As shown in FIG. 10, the detection direction includes the first detection direction (e.g., the X-axis direction) and the second detection direction (e.g., the Y-axis direction) that are orthogonal to each other in plan view of the keyboard 2. The feeding coil 3a includes the feeding coil 3a-1 (e.g., a first feeding coil) including a plurality of sub-coils 31 aligned in the first detection direction (e.g., the X-axis direction) and the feeding coil 3a-2 (e.g., a second feeding coil) including a plurality of sub-coils 31 aligned in the second detection direction (e.g., the Y-axis direction).

In various embodiments, the incoming coil 4a includes an incoming coil 4a-1 (e.g., a first incoming coil) corresponding to the first detection direction (e.g., the X-axis direction) and an incoming coil 4a-2 (e.g., a second incoming coil) corresponding to the second detection direction (e.g., the Y-axis direction).

In this embodiment, the feeding-signal generation unit 14 is configured to supply a generated AC signal to the feeding coil 3a-1 and the feeding coil 3a-2. Further, the coupling-strength generator 153 generates a coupling coefficient kx for the first detection direction (e.g., the X-axis direction) and a coupling coefficient ky for the second detection direction (e.g., the Y-axis direction).

The position detector 154, in some embodiments, is configured to detect the position of the keyboard 2 in the first detection direction (e.g., the X-axis direction) based on the coupling strength (e.g., coupling coefficient kx) between the feeding coil 3a-1 and the incoming coil 4a-1. The position detector 154 is also configured to detect the position of the keyboard 2 in the second detection direction (e.g., the Y-axis direction) based on the coupling strength (e.g., coupling coefficient ky) between the feeding coil 3a-2 and the incoming coil 4a-2. In certain embodiments, the input controller 151 and the display controller 155 may use a part of the area 13B that becomes visible due to the movement of the keyboard 2 in the second detection direction (e.g., the Y-axis direction) as an input device, such as a touch pad or a pen drawing tablet.

Figure 11:
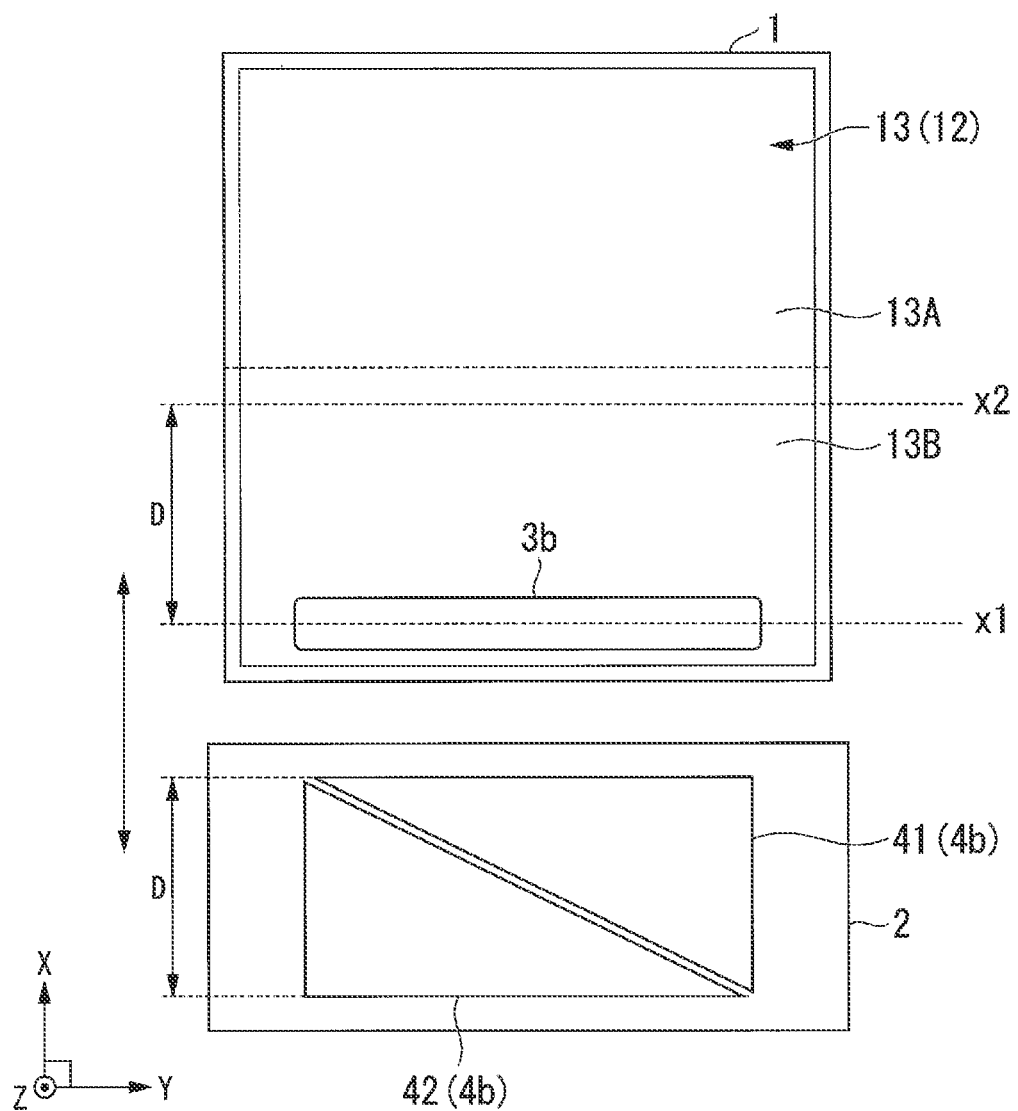
FIG. 11 is a diagram of yet another embodiment of the feeding coil and the incoming coil of FIG. 2.

FIG. 11 shows yet another of the feeding coil 3 and the incoming coil 4. As shown in FIG. 11, the information processing device 1 includes a feeding coil 3b and the keyboard 2 includes an incoming coil 4b (e.g., an incoming coil 41 and an incoming coil 42). The following describes the keyboard 2 including a plurality of incoming coils 4b according to various embodiments.

As shown in FIG. 11, the incoming coil 4b includes the incoming coil 41 (e.g., a first incoming coil) and the incoming coil 42 (e.g., a second incoming coil). The incoming coil 41 includes a triangular coil including a base perpendicular to the X-axis direction in plan view. In one embodiment, the incoming coil 41 is a right-angled triangular coil. The X-axis direction is a detection direction to detect the position of the keyboard 2 on the display screen of the display unit 13 (e.g., on the screen of the area 13B) in plan view of the keyboard 2.

The incoming coil 42, in certain embodiments, includes a reverse triangular coil that corresponds to a point-symmetrically reversed incoming coil 41. In some embodiments, the incoming coil 42 includes a right-angled triangular coil that corresponds to a point-symmetrically reversed incoming coil 41. In various embodiments, the incoming coil 41 and the incoming coil 42 are disposed so that movement of the keyboard 2 in the X-axis direction increases the coupling coefficient k1 between the feeding coil 3 and the incoming coil 41 while decreasing the coupling coefficient k2 between the feeding coil 3 and the incoming coil 42.

As further shown in FIG. 11, the feeding coil 3b includes a rectangular coil including the longitudinal direction in the Y-axis direction. The feeding coil 3b is disposed at a lower portion of the area 13B and at a position corresponding to the incoming coil 4b (e.g., the incoming coil 41 and the incoming coil 42), as described elsewhere herein. In some embodiments, the coupling-strength generator 153 is configured to acquire an incoming voltage value of the incoming coil 41 and an incoming voltage value of the incoming coil 42 from the keyboard 2 and generate the coupling coefficient k1 between the feeding coil 3 and the incoming coil 41 and the coupling coefficient k2 between the feeding coil 3 and the incoming coil 42.

Figure 12:
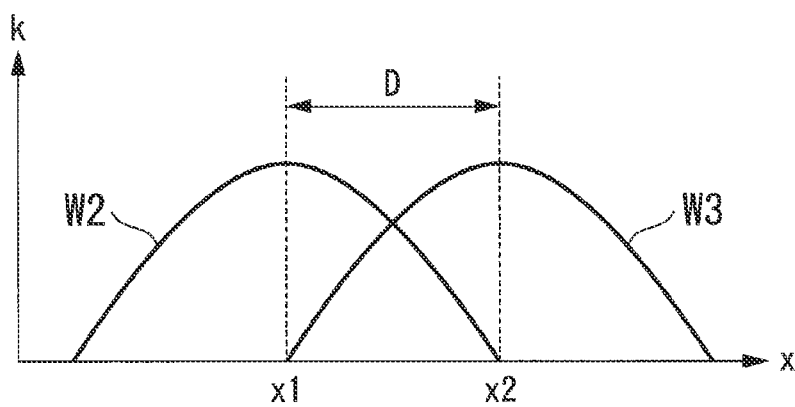
FIG. 12 is a diagram illustrating one embodiment of the relationship between a keyboard position and a coupling coefficient in the feeding coil and the incoming coil of FIG. 11.

Referring now to FIG. 12, the following describes the characteristics of the coupling coefficient k1 and the coupling coefficient k2. FIG. 12 shows one example of the relationship between the position of the keyboard 2 and the coupling coefficients (k1, k2) according to various embodiments.

The graph shown in FIG. 12 illustrates a change of the coupling coefficient k1 between the feeding coil 3 and the incoming coil 41 and the coupling coefficient k2 between the feeding coil 3 and the incoming coil 42 when the position of the keyboard 2 changes in the X-axis direction (e.g., a detection direction) on the display screen of the display unit 13 (area 13B). The waveform W2 shows the characteristic of the coupling coefficient k1 and the waveform W3 shows the characteristic of the coupling coefficient k2.

The position x1 corresponds to the position of the keyboard 2 in which the incoming coil 41 overlaps with the feeding coil 3 in the largest area and the position x2 corresponds to the position of the keyboard 2 where the incoming coil 42 overlaps with the feeding coil 3 in the largest area. As shown with the waveforms W2 and W3 in FIG. 12, the coupling coefficient k1 is the maximum at the position x1 and the coupling coefficient k2 is the maximum at the position x2. The distance D between the position x1 and the position x2 corresponds to the width of the incoming coil 41 and the incoming coil 42 in the X-axis direction.

In certain embodiments, the position detector 154 is configured to detect the position of the keyboard 2 based on the characteristics of the coupling coefficient k1 and the coupling coefficient k2 indicated with the waveform W2 and the waveform W3 of FIG. 12. As described herein, the information processing system 100 according to various embodiments includes the information processing device 1, the external keyboard 2, and the position detector 154. The keyboard 2 includes the wireless communication unit 21 (e.g., a first communication unit), the incoming coil 4 placed inside of the keyboard 2, and the input controller 261. The information processing device 1 includes the wireless communication unit 11 (e.g., a second communication unit), the feeding coil 3, the display unit 13 (planar portion) on which the keyboard 2 can be placed, and the display controller 155. The wireless communication unit 11 communicates with the external keyboard 2. The feeding coil 3 is disposed below the display unit 13 (planar portion) and can feed electricity to the incoming coil 4 by electromagnetically induced coupling. The position detector 154 detects the positional relationship between the display unit 13 (planar portion) and the keyboard 2 based on the coupling strength of the electromagnetically induced coupling between the feeding coil 3 and the incoming coil 4. The display controller 155 changes the display area of the display unit 13 according to the positional relationship with the keyboard 2. The wireless communication unit 21 communicates with the wireless communication unit 11. The input controller 261 controls the wireless communication unit 21 to transmit operating information indicating the input operation received from the user. The planar portion has the display unit 13 having the display area controlled by the display controller 155, and the display controller 155 changes the display area in accordance with the positional relationship between the planar portion (display unit 13) and the keyboard 2.

With this configuration, the information processing system 100 according to various embodiments changes the display area of the display unit 13 according to the positional relationship between the information processing device 1 (e.g., the display unit 13) and the keyboard 2 and so implements more flexible input/output control thereof. The information processing system 100 according to the various embodiments therefore implements more flexible input/output control according to the positional relationship between the keyboard 2 and the information processing device 1 (e.g., the display unit 13).

In some embodiments, the keyboard 2 includes the storage unit 24 that stores electricity and/or power received by the incoming coil 4 and supplies the operating electricity to operate the keyboard 2. Accordingly, various embodiments of the information processing system 100 detects the positional relationship between the keyboard 2 and the information processing device 1 (e.g., display unit 13) while supplying the stored electricity (e.g., charged electricity/power) in the storage unit 24. In the information processing system 100 according to some embodiments, the feeding coil 3 and the incoming coil 4 that supply charging electricity to the storage unit 24 can be used for the position detection of the keyboard 2. This can simplify the structure to detect the position of the keyboard 2.

The information processing system 100, in some embodiments, includes a coupling-strength generator 153 configured to generate the index value (e.g., coupling coefficient k) indicating the coupling strength based on the feeding voltage that is the voltage across the feeding coil 3 and the incoming voltage that is the voltage across the incoming coil 4. In certain embodiments, the position detector 154 is configured to detect the positional relationship between the display unit 13 (e.g., a planar portion) and the keyboard 2 based on the index value (e.g., the coupling coefficient k) indicating the coupling strength generated by the coupling-strength generator 153. Here, the information processing system 100 is configured to detects the positional relationship between the display unit 13 (planar portion) and the keyboard 2 via a relatively simple technique.

In various embodiments, the information processing device 1 includes the coupling-strength generator 153 and the position detector 154. The coupling-strength generator 153 is configured to generate an index value (e.g., coupling coefficient k) indicating the coupling strength based on the feeding voltage and the incoming voltage acquired from the keyboard 2. In one embodiment, the coupling-strength generator 153 is configured to calculate the voltage ratio (V2/V1) between the feeding voltage V1 and the incoming voltage V2 as a substitute for the coupling coefficient k. Here, the information processing system 100 detects the positional relationship between the display unit 13 and the keyboard 2 via a relatively simple technique.

Some embodiments include the feeding coil 3 made up of a plurality of sub-coils 31. The plurality of sub-coils 31 is aligned in the detection direction (e.g., the X-axis direction) to detect the position of the keyboard 2 on the display screen of the display unit 13 (e.g., on the planar portion) in plan view and is disposed to generate magnetic flux in the same direction. The incoming coil 4 includes a predetermined coil width in the detection direction (e.g., the X-axis direction) corresponding to the width of the keyboard 2 in the detection direction (e.g., the X-axis direction) in plan view. In one embodiment, the coil width of the incoming coil 4 in the detection direction (e.g., the X-axis direction) is substantially equal to the width of the keyboard 2 in the detection direction (e.g., the X-axis direction), which allows/enables the information processing system 100 to accurately detect the position of the keyboard 2 in the detection direction (e.g., the X-axis direction) because the width of the keyboard 2 in the detection direction (e.g., the X-axis direction) corresponds to the coil width of the incoming coil 4 in the detection direction (e.g., the X-axis direction).

In various embodiments, the detection direction includes a first detection direction (e.g., the X-axis direction) and a second detection direction (e.g., the Y-axis direction) that are orthogonal to each other in plan view of the keyboard 2. The feeding coil 3a includes the feeding coil 3a-1 (e.g., a first feeding coil) including a plurality of sub-coils aligned in the first detection direction (e.g., the X-axis direction) and the feeding coil 3a-2 (second feeding coil) including a plurality of sub-coils aligned in the second detection direction (e.g., the Y-axis direction). The incoming coil 4a includes the incoming coil 4a-1 (e.g., a first incoming coil) corresponding to the first detection direction and the incoming coil 4a-2 (e.g., a second incoming coil) corresponding to the second detection direction. The position detector 154 detects the position of the keyboard 2 in the first detection direction (e.g., the X-axis direction) based on the coupling strength (e.g., coupling coefficient kx) between the feeding coil 3a-1 and the incoming coil 4a-1 and the position of the keyboard 2 in the second detection direction (e.g., the Y-axis direction) based on the coupling strength (e.g., coupling coefficient ky) between the feeding coil 3a-2 and the incoming coil 4a-2, which allows/enables the information processing system 100 to detect the position of the keyboard 2 in the two directions including the first detection direction (e.g., the X-axis direction) and the second detection direction (e.g., the Y-axis direction).

In further embodiments, the incoming coil 4 includes the incoming coil 41 (e.g., a first incoming coil) and the incoming coil 42 (e.g., a second incoming coil). The incoming coil 41 includes a triangular coil including a base (e.g., a base in the Y-axis direction) perpendicular to the detection direction (e.g., the X-axis direction) to detect the position of the keyboard 2 on the display screen of the display unit 13 (e.g., on the planar portion) in plan view of the keyboard 2. The incoming coil 42 includes a reverse triangular coil that corresponds to a point-symmetrically reversed incoming coil 41. The incoming coil 41 and the incoming coil 42 are disposed so that movement of the keyboard 2 in the detection direction (e.g., the X-axis direction) to increase the coupling coefficient k1 between the feeding coil 3 and the incoming coil 41 while decreasing the coupling coefficient k2 between the feeding coil 3 and the incoming coil 42, which allows/enables the information processing system 100 to detect more accurately the position of the keyboard 2 in the detection direction (e.g., X-axis direction) based on the coupling coefficient k1 and the coupling coefficient k2.

In various embodiments, the information processing device 1 includes, among other components, the wireless communication unit 11 (e.g., a communication unit), the feeding coil 3, the position detector 154, and the display controller 155. The wireless communication unit 11 is configured to communicate with the external keyboard 2 including the incoming coil 4 and receive an input operation from the user. The feeding coil 3 supplies electricity to the incoming coil 4 by an electromagnetically induced coupling. The position detector 154 is configured to detect the positional relationship between the display unit 13 and the keyboard 2 based on the coupling strength (e.g., the coupling coefficient k) of the electromagnetically induced coupling between the feeding coil 3 and the incoming coil 4. The display controller 155 is configured to change the display area of the display unit 13 according to the positional relationship with the keyboard 2. Here, the information processing device 1 achieves the same effects as the above-described information processing system 100 and implements more flexible input/output control according to the positional relationship between the keyboard 2 and the information processing device 1 (e.g., the display unit 13).

A method for detecting the keyboard position according to various embodiments detects the position of the keyboard 2 relative to the information processing device 1 and includes an electricity feeding step and a position detecting step. The information processing device 1 includes the feeding coil 3 that supplies electricity to the incoming coil 4 by an electromagnetically induced coupling and a display controller 155 that changes the display area of the display unit 13 according to the positional relationship with the external keyboard 2. The keyboard 2 includes the incoming coil 4 and transmits operating information indicating an input operation received from the user to the information processing device 1. In some embodiments, the feeding coil 3 feeds electricity/power to the incoming coil 4. Further, the position detector 154 detects the positional relationship between the display unit 13 (planar portion) and the keyboard 2 based on the coupling strength of the electromagnetically induced coupling between the feeding coil 3 and the incoming coil 4. Here, the method for detecting a keyboard position achieves the same effects as the above-described information processing system 100 and implements more flexible input/output control according to the positional relationship between the keyboard 2 and the information processing device 1 (e.g., the display unit 13).

The following describes an information processing system 100a according to further embodiments. The information processing system 100a according to the various embodiments is configured so that a keyboard 2a generates the coupling strength (e.g., a coupling coefficient k).

Figure 13:
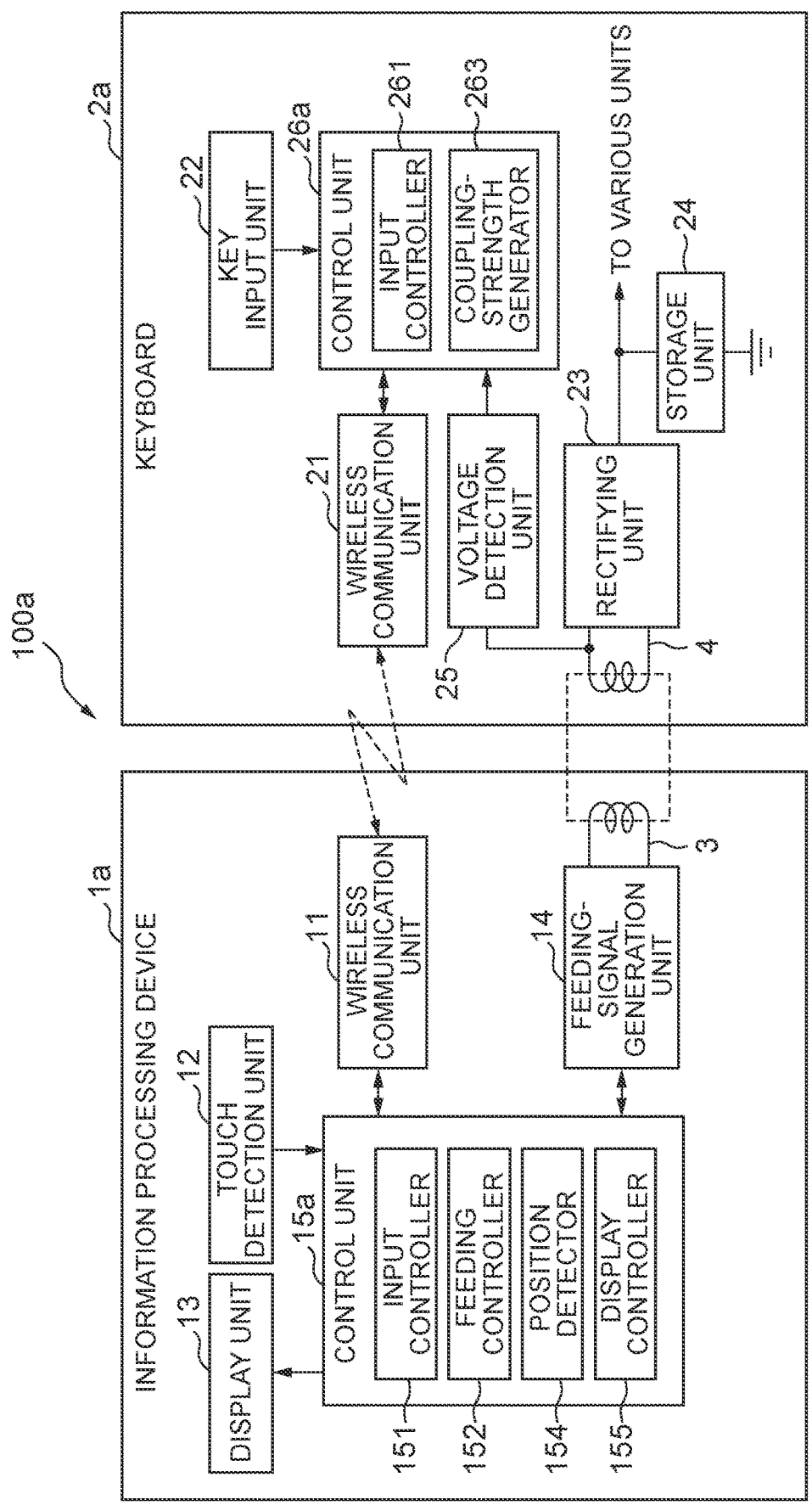
FIG. 13 is a schematic diagram illustrating another embodiment of an information processing system.

FIG. 13 is a functional block diagram showing one embodiments of an information processing system 100a. Various embodiments of an information processing system 100a includes an appearance similar to that of the information processing system 100 shown in FIG. 1 and are not shown.

As shown in FIG. 13, the information processing system 100a includes, among other components, an information processing device 1a and an external keyboard 2a. In one embodiment, the information processing device 1a and the keyboard 2a are connected via wireless communication.

In various embodiments, the information processing device 1a includes, among other components, a wireless communication unit 11, a touch detection unit 12, a display unit 13, a feeding-signal generation unit 14, a control unit 15a, and a feeding coil 3. The keyboard 2a includes, among other components, a wireless communication unit 21, a key input unit 22, a rectifying unit 23, a storage unit 24, a voltage detection unit 25, a control unit 26a, and an incoming coil 4.

In FIG. 13, like numerals indicate like components of the embodiment illustrated in FIG. 2, as described above, to omit their descriptions. The control unit 26a, in various embodiments, includes a processor including a CPU and is configured to control the keyboard 2a as a whole. The control unit 26a includes an input controller 261 and a coupling-strength generator 263.

In some embodiments, when the feeding coil 3 feeds electricity (e.g., power) to the incoming coil 4, the coupling-strength generator 263 acquires the incoming voltage value detected by the voltage detection unit 25 and, in response thereto, generates a coupling coefficient k between the feeding voltage 3 and the incoming coil 4 based on the acquired incoming voltage value and the feeding voltage value. The feeding voltage value may be acquired from the information processing device 1 via the wireless communication unit 21 or via a preset feeding voltage value based on an actual measurement value, for example, may be used.

The coupling-strength generator 263 is configured to transmit the generated coupling coefficient k to the information processing device 1a via the wireless communication unit 21. In certain embodiments, the control unit 15a includes a processor including a CPU and is configured to execute various types of arithmetic processing in accordance with programs to control the information processing device 1a as a whole. The control unit 15a includes, among other components, an input controller 151, a feeding controller 152, a position detector 154, and a display controller 155. In some embodiments, the position detector 154 is configured to detect the positional relationship between the display unit 13 and the keyboard 2a based on the index value (e.g., a coupling coefficient k) indicating the coupling strength acquired from the keyboard 2a.

Figure 14:
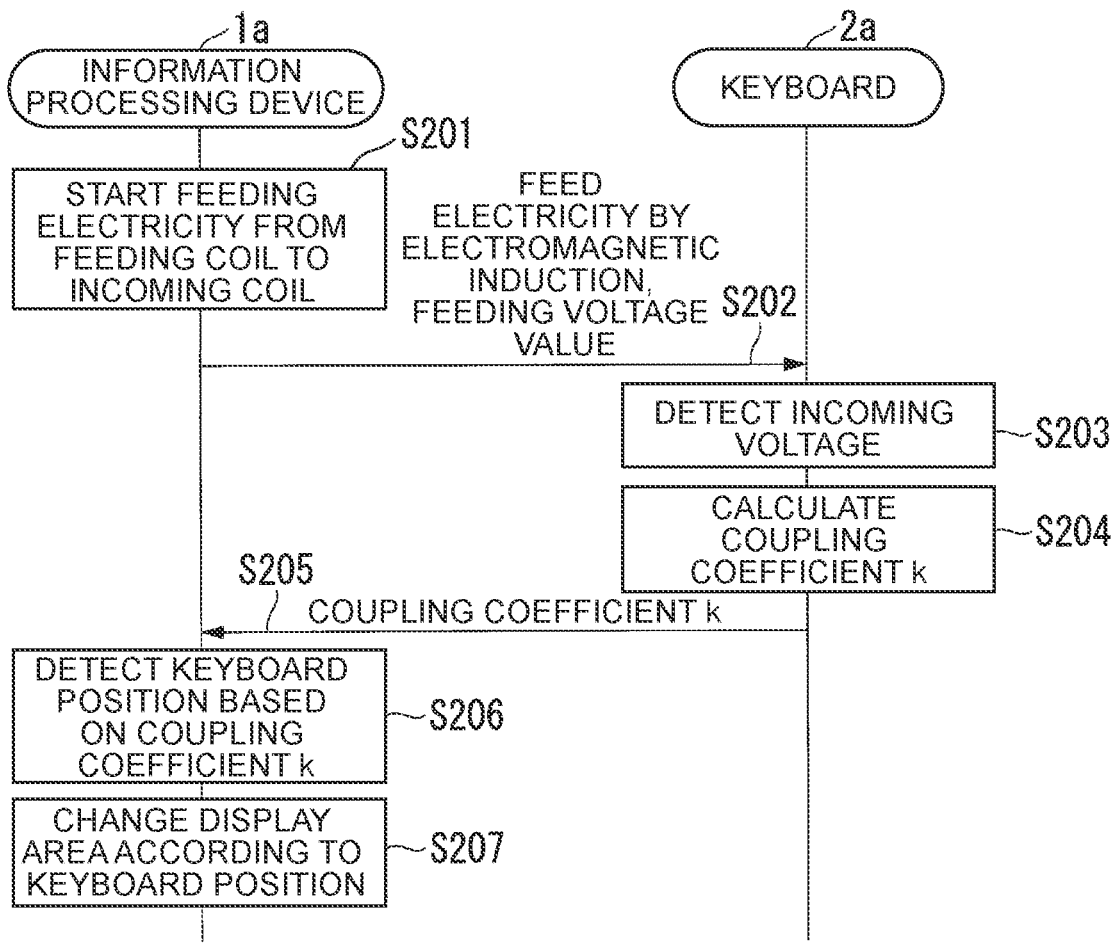
FIG. 14 is a schematic diagram illustrating one embodiment of position detection processing of a keyboard in the information processing system of FIG. 13.

With reference to FIG. 14, the following describes the operation of the information processing system 100a according to various embodiments. FIG. 14 shows one embodiment of position detection processing of the keyboard 2a in the information processing system 100a.

As shown in FIG. 14, the information processing device 1a starts feeding electricity/power from the feeding coil 3 to the incoming coil 4 (block S201). The feeding controller 152 of the information processing device 1a controls the feeding-signal generation unit 14 to generate an AC signal and starts feeding electricity from the feeding coil 3.

The information processing device 1a then feeds electricity via electromagnetic induction and transmits the feeding voltage value (block S202). The information processing device 1a feeds electricity from the feeding coil 3 to the incoming coil 4 of the keyboard 2a and transmits the feeding voltage value to the wireless communication unit 21 of the keyboard 2a via the wireless communication unit 11.

The keyboard 2a detects the incoming voltage (block S203). The voltage detection unit 25 of the keyboard 2a detects the incoming voltage generated across the incoming coil 4 and outputs the incoming voltage value indicating the incoming voltage to the control unit 26a.

The coupling-strength generator 263 of the keyboard 2a calculates the coupling coefficient k (block S204). In one embodiment, the coupling-strength generator 263 calculates the coupling coefficient k based on the feeding voltage V1 acquired from the information processing device 1a and the incoming voltage V2 detected by the voltage detection unit 25. The coupling-strength generator 263 calculates the coupling coefficient k based on the voltage ratio (V2/V1) between the feeding voltage V1 and the incoming voltage V2.

The keyboard 2a transmits the calculated coupling coefficient k to the information processing device 1a (block S205). The coupling-strength generator 263 transmits the calculated coupling coefficient k to the wireless communication unit 11 of the information processing device 1a by wireless communication via the wireless communication unit 21.

The position detector 154 of the information processing device 1a detects the position of the keyboard 2a based on the coupling coefficient k acquired from the keyboard 2a (block S206). The display controller 155 of the information processing device 1a changes the display area according to the position of the keyboard 2a (block S207).

As described elsewhere herein, in the information processing system 100a of various embodiments, the keyboard 2a includes the coupling-strength generator 263 and the information processing device 1a includes the position detector 154. The coupling-strength generator 263 generates an index value (e.g., a coupling coefficient) indicating the coupling strength based on the feeding voltage that is the voltage across the feeding coil 3 and the incoming voltage that is the voltage across the incoming coil 4. The position detector 154 detects the positional relationship between the display unit 13 (e.g., a planar portion) and the keyboard 2 based on the index value (e.g., the coupling coefficient) indicating the coupling strength acquired from the keyboard 2a. Here, the various embodiments of the information processing system 100a achieves the same effects as the various embodiments of the information processing system 100 and implement more flexible input/output control according to the positional relationship between the keyboard 2a and the information processing device 1a (e.g., display unit 13).

The following describes an information processing system 100b according to various further embodiments. The information processing system 100b according to various embodiments are configured so that a keyboard 2b generates an index value (e.g., a coupling coefficient k) indicating the coupling strength and detects the positional relationship between the display unit 13 and the keyboard 2b.

Figure 15:
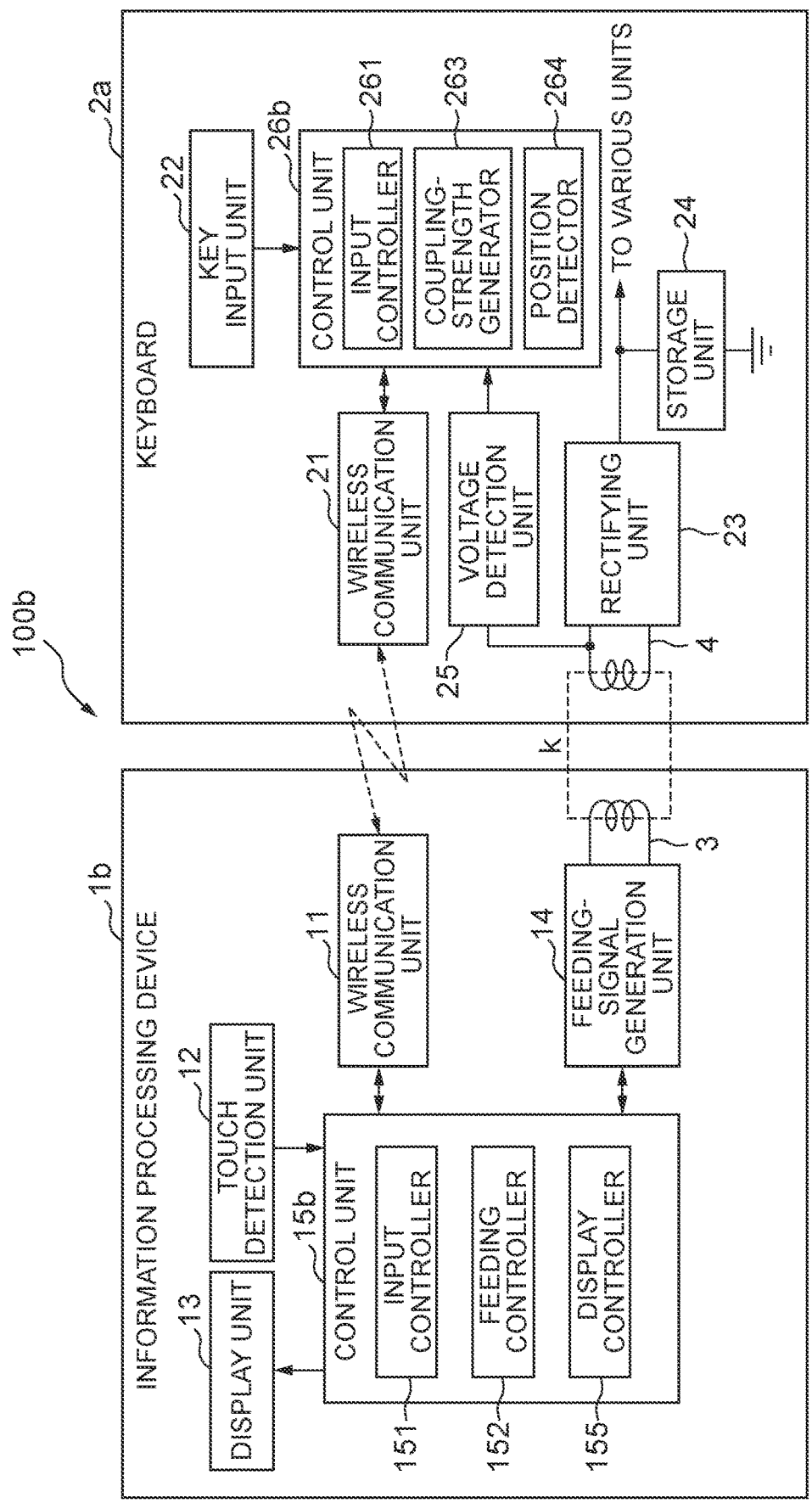
FIG. 15 is a schematic diagram illustrating yet another embodiment of an information processing system.

FIG. 15 is a functional block diagram showing one embodiment of an information processing system 100b. Various embodiments of an information processing system 100b include an appearance similar to that of the information processing system 100 shown in FIG. 1 and are not shown.

As shown in FIG. 15, the information processing system 100b includes an information processing device 1b and an external keyboard 2b. In one example, the information processing device 1b and the keyboard 2b are connected by wireless communication.

The information processing device 1b includes, among other components, a wireless communication unit 11, a touch detection unit 12, a display unit 13, a feeding-signal generation unit 14, a control unit 15b, and a feeding coil 3. The keyboard 2b includes, among other components, a wireless communication unit 21, a key input unit 22, a rectifying unit 23, a storage unit 24, a voltage detection unit 25, a control unit 26b, and an incoming coil 4.

In FIG. 15, like numerals indicate like components in FIGS. 2 and 13, as described above to omit their descriptions. In one embodiment, the control unit 26b includes a processor including a CPU and is configured to control the keyboard 2b as a whole. The control unit 26b includes, among other components, an input controller 261, a coupling-strength generator 263, and a position detector 264.

The position detector 264 is configured to detect the positional relationship between the display unit 13 and the keyboard 2b based on the index value (e.g., a coupling coefficient k) indicating the coupling strength generated by the coupling-strength generator 263. The position detector 264 is configured to transmit the position information of the keyboard 2b indicating the detected positional relationship between the display unit 13 and the keyboard 2b to the information processing device 1b via the wireless communication unit 21.

In certain embodiments, the control unit 15b includes a processor including a CPU and is configured to execute various types of arithmetic processing in accordance with programs to control the information processing device 1b as a whole. The control unit 15b includes, among other components, an input controller 151, a feeding controller 152, and a display controller 155. The display controller 155, in various embodiments, is configured to change the display area of the display unit 13 according to the positional relationship with the keyboard 2b that is acquired from the keyboard 2b (e.g., positional information on the keyboard 2b).

Figure 16:
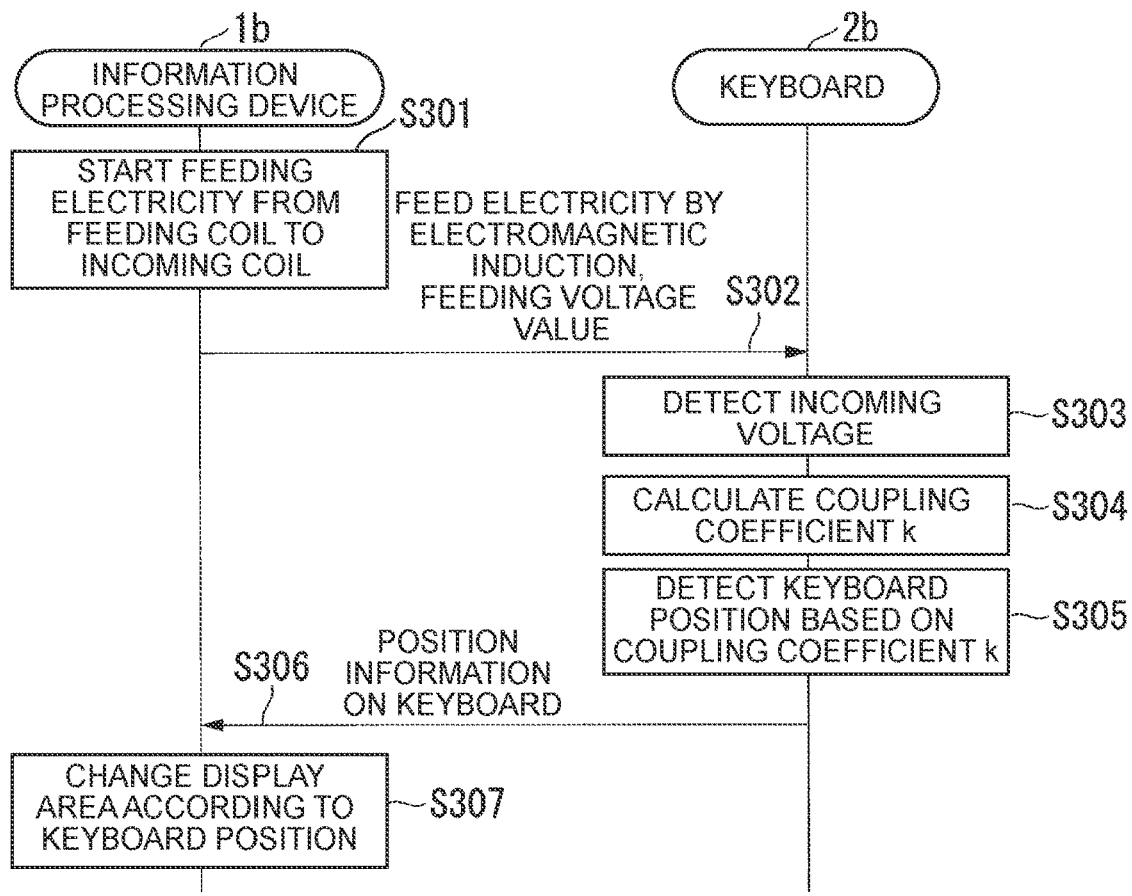
FIG. 16 is a schematic diagram illustrating one embodiment of position detection processing of a keyboard in the information processing system of FIG. 13.

Referring to FIG. 16, the following describes the operation of the information processing system 100b according to various embodiments. FIG. 16 shows one embodiment of position detection processing of the keyboard 2b in the information processing system 100b according to various embodiments.

As shown in FIG. 16, the information processing device 1b starts feeding electricity from the feeding coil 3 to the incoming coil 4 (block S301). The feeding controller 152 of the information processing device 1b controls the feeding-signal generation unit 14 to generate an AC signal and starts feeding of the electricity from the feeding coil 3.

The information processing device 1b feeds electricity by electromagnetic induction and transmits the feeding voltage value (block S302). The information processing device 1b feeds electricity from the feeding coil 3 to the incoming coil 4 of the keyboard 2b and transmits the feeding voltage value to the wireless communication unit 21 of the keyboard 2b via the wireless communication unit 11.

The keyboard 2b detects the incoming voltage (block S303). The voltage detection unit 25 of the keyboard 2b detects the incoming voltage generated across the incoming coil 4, and outputs the incoming voltage value indicating the incoming voltage to the control unit 26b.

The coupling-strength generator 263 of the keyboard 2b calculates the coupling coefficient k (block S304). The position detector 264 of the keyboard 2b detects the position of the keyboard 2b based on the coupling coefficient k (block S305). The position detector 264 detects the positional relationship between the display unit 13 and the keyboard 2b based on the coupling coefficient k generated by the coupling-strength generator 263.

The keyboard 2b transmits the detected position information on the keyboard 2b to the information processing device 1b (block S306). The position detector 264 transmits the detected position information on the keyboard 2b to the wireless communication unit 11 of the information processing device 1b by wireless communication via the wireless communication unit 21. The display controller 155 of the information processing device 1b changes the display area according to the position of the keyboard 2b (block S307).

As described above, in the information processing system 100b of various embodiments, the keyboard 2b includes the coupling-strength generator 263 and the position detector 264 and the display controller 155 of the information processing device 1b changes the display area of the display unit 13 according to the positional relationship with the keyboard 2b acquired from the keyboard 2b. Here, the information processing system 100b of the various embodiments achieve the same effects as in the various embodiments discussed elsewhere herein and implements more flexible input/output control according to the positional relationship between the keyboard 2b and the information processing device 1b (e.g., the display unit 13).

In certain embodiments, the keyboard 2b includes, among other components, a keyboard 2b that transmits operating information indicating an input operation received from a user to the information processing device 1b and includes the wireless communication unit 21 (e.g., a communication unit), the incoming coil 4, the input controller 261 and the position detector 264. The information processing device 1b includes, among other components, the feeding coil 3 and the display controller 155. The feeding coil 3 supplies electricity to the incoming coil 4 by an electromagnetically induced coupling. The wireless communication unit 21 communicates with the information processing device 1b. The incoming coil 4 receives electricity from the feeding coil 3 via electromagnetically induced coupling. The input controller 261 controls the wireless communication unit 21 to transmit operating information indicating the input operation received from the user. The position detector 264 detects the positional relationship between the display unit 13 (e.g., a planar portion) and the keyboard 2b based on the coupling strength (e.g., a coupling coefficient k) of electromagnetically induced coupling between the feeding coil 3 and the incoming coil 4. The display controller 155 changes the display area of the display unit 13 according to the positional relationship with the external keyboard 2b. Here, the keyboard 2b of the various embodiments achieve the same effects as in the various embodiments discussed elsewhere herein and implements more flexible input/output control according to the positional relationship between the keyboard 2b and the information processing device 1b (e.g., the display unit 13).

Figure 17:
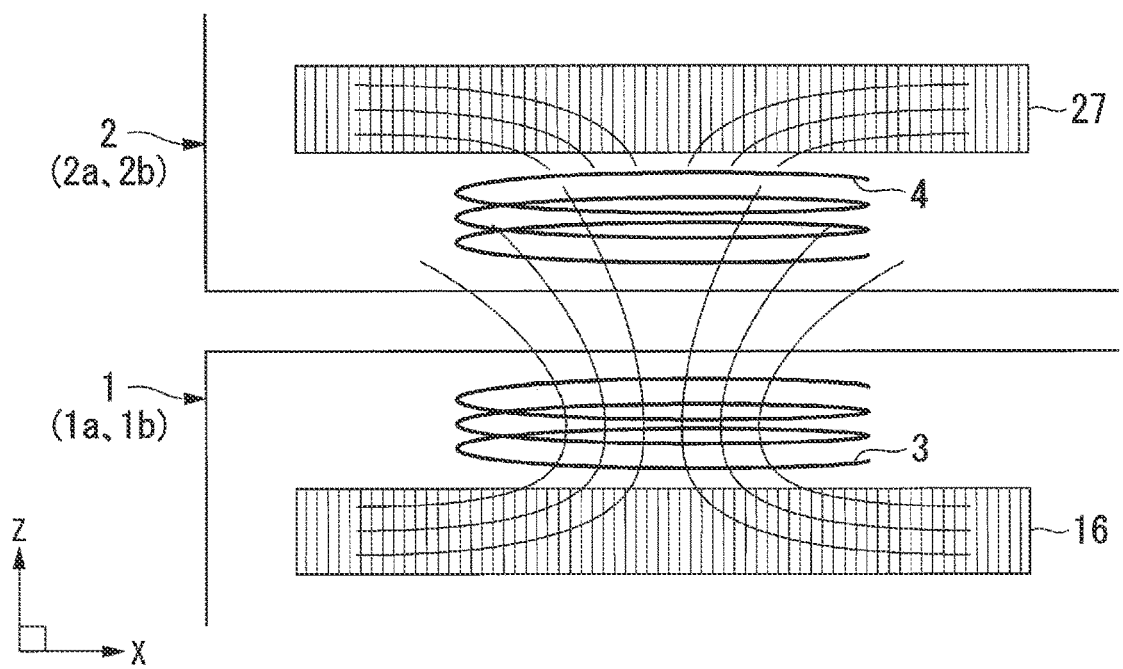
FIG. 17 is a cross-sectional view of one embodiment of an information processing device and a keyboard including ferrite sheets.

Referring to FIG. 17, the following describes various embodiments that include a ferrite sheet. FIG. 17 is a cross-sectional view of the information processing device 1 (1a, 1b) and the keyboard 2 (2a, 2b) including ferrite sheets (16, 27). As shown in FIG. 17, the information processing device 1 (1a, 1b) includes the ferrite sheet 16 and the keyboard 2 (2a, 2b) includes the ferrite sheet 27.

In various embodiments, the ferrite sheet 16 includes a magnetic sheet made of a highly permeable material. The ferrite sheet 16 is disposed in the information processing device 1 (1a, 1b) on the opposite side of the incoming coil 4 relative to the feeding coil 3 in the thickness direction (e.g., the Z-axis direction).

In additional or alternative embodiments, the ferrite sheet 27 includes a magnetic sheet made of a highly permeable material. The ferrite sheet 27 is disposed in the keyboard 2 (2a, 2b) on the opposite side of the feeding coil 3 relative to the incoming coil 4 in the thickness direction (Z-axis direction).

In certain embodiments, the ferrite sheet 16 and the ferrite sheet 27 are disposed on the opposite side of the faces opposed to the feeding coil 3 and the incoming coil 4, respectively, so as to concentrate the flowing out of magnetic lines toward the faces opposed to the feeding coil 3 and the incoming coil 4. In this manner the information processing system 100 (100a, 100b) of the various embodiments includes the ferrite sheet 16 and the ferrite sheet 27, which increases the efficiency of supplying electricity and/or power by electromagnetic induction.

The various embodiments are not limited to the above-described embodiments and can be modified without deviating from the scope of the present invention. For example, various embodiments describe the sub-coils 31 as rectangular coils, and they are not limited to such coils. These coils may include other shapes, such as triangles, ellipses, and honeycomb shapes, among other shapes that are possible and contemplated herein. The above examples describe the incoming coil 4a (4a-1, 4a-2) formed with one coil, and these coils are not limited to such. Similar to the feeding coil 3a (3a-1, 3a-2), the incoming coil also may be made up of a plurality of sub-coils.

Further embodiments describe the right-angled triangular incoming coil 41 and incoming coil 42, and these coils are not limited to these embodiments. These incoming coils may include other triangular shapes. The incoming coil 41 and the incoming coil 42 may be made up of a plurality of sub-coils.

As described above, the position detector 154 is configured to detect the position of the keyboard 2 based on the coupling coefficient k1 between the feeding coil 3 and the incoming coil 41 and the coupling coefficient k2 between the feeding coil 3 and the incoming coil 42. The position detector 154 is not limited to this description. For example, the position detector 154 may detect the position of the keyboard 2 based on the ratio of the incoming voltage of the incoming coil 41 and the incoming voltage of the incoming coil 42 as a substitute for the coupling coefficient k1 and the coupling coefficient k2. That is, the position detector 154 may detect the position of the keyboard 2 based on the ratio between the incoming voltage of the incoming coil 41 and the incoming voltage of the incoming coil 42.

The above embodiments describe the information processing device 1 (1a, 1b) and the keyboard 2 (2a, 2b) communicating with each other by wireless communication via the wireless communication unit (11, 21), and the communication is not limited to this example. For example, they may communicate by wired communication, such as a Universal Serial Bus (USB).

The above embodiments describe the coupling coefficient k as embodiments of the index value indicating the coupling strength, and other index values, such as a voltage ratio (V2/V1) of the feeding voltage V1 and the incoming voltage V2, may be used. Further, the above embodiments describe embodiments in which various values, such as the incoming voltage value, the feeding voltage value, and the coupling coefficient k, are transmitted by wireless communication via the wireless communication unit (11, 21), and transmission of these values is not limited to such. The various values, such as the incoming voltage value, the feeding voltage value, and the coupling coefficient k, may be transmitted by wireless communication between the feeding coil 3 and the incoming coil 4, such as Near field Communication (NFC). In addition, the above embodiments describe embodiments in which the keyboard 2 (2a, 2b) includes the storage unit 24, and the keyboard 2 (2a, 2b) is not limited to such.

In other embodiments, the keyboard 2 (2a, 2b) may not include the storage unit 24. The above embodiments describe embodiments in which the electricity received by the incoming coil 4 of the keyboard 2 (2a, 2b) is used for the charging electricity of the storage unit 24 or for the operating power of the keyboard 2 (2a, 2b), and the keyboard 2 (2a, 2b) is not limited to such. For example, the keyboard 2 (2a, 2b) may be configured to use electricity supplied from a USB, or the like, as charging electricity or power of the storage unit 24 and operating power of the keyboard 2 (2a, 2b).

The above embodiments describe the example in which the information processing device 1 (1a, 1b) is a laptop personal computer (laptop PC) or a tablet terminal, and the information processing device 1 (1a, 1b) may be another device. The above embodiments describe embodiments of the information processing device 1 (1a, 1b) including a single display unit 13 and touch detection unit 12 that are foldable. In other embodiments, the information processing device may include a multiscreen including a plurality of display units 13 and touch detection units 12.

The above-described information processing device 1 (1a, 1b) and keyboard 2 (2a, 2b) each internally include a computer system. A program to implement the functions of various configurations of the information processing device 1 (1a, 1b) and the keyboard 2 (2a, 2b), as described above, may be stored in a computer-readable recording medium and the processing at the various configurations of the information processing device 1 (1a, 1b) and the keyboard 2 (2a, 2b) may be performed by causing the computer system to read and execute the program stored in this recording medium. "Causing the computer system to read and execute the program stored in the recording medium" includes, among other definition, installing of such a program in the computer system. The "computer system" here includes an operating system (OS) and hardware, such as peripherals.

The "computer system" may include a plurality of computer devices connected via a network, including the internet and communication lines, such as WAN, LAN and dedicated lines. The "computer-readable recording medium" includes a portable and/or non-transitory medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium in which a distribution server can access to distribute the program. The program may be divided into a plurality of pieces and/or portions. After these pieces/portions of program may be downloaded at different times, they may be combined to have the configuration of the information processing device 1 (1a, 1b) or the keyboard 2 (2a, 2b). Different distribution servers may distribute these divided pieces of program. The "computer-readable recording medium" also includes the one that can hold a program for a certain period of time, as in a server that receives a program transmitted via a network or a volatile memory (e.g., RAM) in the computer system as the client. The program may implement a part of the functions as stated above. The program may be a differential file (e.g., a differential program) that can implement the above functions by combining it with a program which is already stored in the computer system.

A part or all of the functions, as stated above, may be implemented as an integrated circuit, such as Large Scale Integration (LSI). Each of the functions as stated above may be implemented as one processor, or a part or all of the functions may be implemented as one processor in an integrated manner. A technology for integrated circuit is not limited to an LSI and an integrated circuit may be realized using a dedicated circuit or a general-purpose processor. If a technology for integrated circuit that replaces LSIs becomes available with the development of semiconductor technology, an integrated circuit based on such a technology may be used.

The above-described embodiments of the present technology can implement more flexible input/output control according to the positional relationship between the keyboard and the information processing device. The various embodiments may be practiced in other specific forms such that the described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

The invention claimed is:
1. A system, comprising:
an external keyboard including a first communication unit, an incoming coil disposed inside thereof, and an input controller configured to control the first communication unit to transmit operating information indicating an input operation from a user;
an information processing device including a second communication unit configured to communicate with the first communication unit, a planar portion on which the keyboard is mountable, and a feeding coil disposed below the planar portion, the feeding coil configured to supply electricity to the incoming coil by an electromagnetically induced coupling; and
a position detector configured to detect a positional relationship between the planar portion and the keyboard based on a coupling strength of the electromagnetically induced coupling between the feeding coil and the incoming coil, wherein:
- the feeding coil includes a plurality of sub-coils,
- the plurality of sub-coils is aligned in a direction to detect a position of the keyboard on the planar portion in plan view,
- the plurality of sub-coils is disposed so as to generate magnetic flux in a same direction,
- the incoming coil includes a predetermined coil width in the detection direction corresponding to the width of the keyboard in the detection direction in plan view,
- the detection direction includes a first detection direction and a second detection direction orthogonal to each other in plan view of the keyboard,
- the feeding coil has a first feeding coil in which the plurality of sub-coils are arranged in the first detection direction, and a second feeding coil in which the plurality of sub-coils is arranged in the second detection direction,
- the incoming coil includes a first incoming coil corresponding to the first detection direction and a second incoming coil corresponding to the second detection direction, and
- the position detector detects a position of the keyboard in the first detection direction based on the coupling strength between the first feeding coil and the first incoming coil, and a position of the keyboard in the second detection direction based on the coupling strength between the second feeding coil and the second incoming coil.

2. The system of claim 1, wherein the keyboard includes a storage unit configured to:
store electricity received by the incoming coil, and
supply operating electricity to operate the keyboard.

3. The system of claim 1, wherein:
the planar portion includes a display unit, the display unit having a display area that is controlled by a display controller, and
the display controller is configured to change the display area according to a positional relationship between the planar portion and the keyboard.

4. The system of claim 3, further comprising:
a coupling-strength generator configured to generate an index value indicating the coupling strength based on a feeding voltage that is a voltage across the feeding coil and an incoming voltage that is a voltage across the incoming coil,
wherein the position detector detects a positional relationship between the planar portion and the keyboard based on the index value indicating the coupling strength generated by the coupling-strength generator.

5. The system of claim 4, wherein:
the keyboard includes the coupling-strength generator:
the information processing device includes the position detector: and
the position detector detects a positional relationship between the planar portion and the keyboard based on an index value indicating the coupling strength acquired from the keyboard.

6. The system of claim 4, wherein:
the keyboard includes the coupling-strength generator and the position detector; and
the display controller changes the display area according to a positional relationship with the keyboard acquired from the keyboard.

7. The system of claim 4, wherein:
the information processing device includes the coupling-strength generator and the position detector; and
the coupling-strength generator generates an index value indicating the coupling strength based on the feeding voltage and the incoming voltage acquired from the keyboard.

8. An apparatus, comprising:
a processor of an information handling device; and
a memory configured to store code executable by the processor to:
communicate with an external keyboard including an incoming coil and receiving an input operation from a user,
supply electricity to the incoming coil by electromagnetically induced coupling,
detect a positional relationship between a display unit and the keyboard based on a coupling strength of the electromagnetically induced coupling between a feeding coil and the incoming coil, and
change a display area of the display unit according to the positional relationship with the keyboard,
wherein:
the incoming coil includes:
a first incoming coil including a triangular shape with a base perpendicular to a detection direction to detect a position of the keyboard on the planar portion in plan view, and
a second incoming coil that is a reverse triangular coil corresponding to the first incoming coil that is point-symmetrically reversed, and
the first incoming coil and the second incoming coil are disposed so that movement of the keyboard in the detection direction increases the coupling strength between the feeding coil and the first incoming coil while decreasing the coupling strength between the feeding coil and the second incoming coil.

9. The apparatus of claim 8, wherein the processor is further configured to:
generate an index value indicating the coupling strength based on a feeding voltage that is a voltage across the feeding coil and an incoming voltage that is a voltage across the incoming coil; and
detect the positional relationship between the display unit and the keyboard further based on the index value.

10. The apparatus of claim 9, wherein:
the coupling-strength generator generates the index value indicating the coupling strength based on the feeding voltage and the incoming voltage acquired from the keyboard.

11. The apparatus of claim 9, wherein:
the feeding coil includes a first feeding coil in which a plurality of sub-coils are arranged in a first detection direction, and a second feeding coil in which the plurality of sub-coils is arranged in a second detection direction;
the incoming coil includes a first incoming coil corresponding to the first detection direction and a second incoming coil corresponding to the second detection direction; and
the processor is further configured to detect a position of the keyboard in the first detection direction based on the coupling strength between the first feeding coil and the first incoming coil, and a position of the keyboard in the second detection direction based on the coupling strength between the second feeding coil and the second incoming coil.

12. The apparatus of claim 9, wherein the processor is further configured to detect a positional relationship between a planar portion of the display unit and the keyboard based on the index value.

13. A method, comprising:
communicating, by a processor of an information handling device, with an external keyboard including an incoming coil and receiving an input operation from a user;
supplying electricity to the incoming coil by electromagnetically induced coupling;
detecting a positional relationship between a display unit and the keyboard based on a coupling strength of the electromagnetically induced coupling between a feeding coil and the incoming coil; and
changing a display area of the display unit according to the positional relationship with the keyboard,
wherein:
the incoming coil includes:
a first incoming coil including a triangular shape with a base perpendicular to a detection direction to detect a position of the keyboard on the planar portion in plan view, and
a second incoming coil that is a reverse triangular coil corresponding to the first incoming coil that is point-symmetrically reversed, and
the first incoming coil and the second incoming coil are disposed so that movement of the keyboard in the detection direction increases the coupling strength between the feeding coil and the first incoming coil while decreasing the coupling strength between the feeding coil and the second incoming coil.

14. The method of claim 13, further comprising:
generating an index value indicating the coupling strength based on a feeding voltage that is a voltage across the feeding coil and an incoming voltage that is a voltage across the incoming coil; and
detecting the positional relationship between the display unit and the keyboard further based on the index value.

15. The method of claim 14, wherein generating the index value comprises:
generating the index based on the feeding voltage and the incoming voltage acquired from the keyboard.

16. The method of claim 14, wherein the feeding coil includes a first feeding coil in which a plurality of sub-coils are arranged in a first detection direction, and a second feeding coil in which the plurality of sub-coils is arranged in a second detection direction, and the incoming coil includes a first incoming coil corresponding to the first detection direction and a second incoming coil corresponding to the second detection direction, the method further comprising:
detecting a position of the keyboard in the first detection direction based on the coupling strength between the first feeding coil and the first incoming coil, and a position of the keyboard in the second detection direction based on the coupling strength between the second feeding coil and the second incoming coil.

17. The method of claim 14, further comprising:
detecting a positional relationship between a planar portion of the display unit and the keyboard based on an index value.

18. The apparatus of claim 8, wherein:
the display unit comprises a display controller and a display area controlled by the display controller; and
the display controller is configured to change the display area according to the positional relationship between the keyboard and a planar portion on which the keyboard is mountable.

19. The apparatus of claim 18, further comprising:
a coupling-strength generator configured to generate an index value indicating the coupling strength based on the feeding voltage; and
a position detector configured to detect the positional relationship based on the index value generated by the coupling-strength generator.

20. The apparatus of claim 19, wherein:
the keyboard includes the coupling-strength generator; and
the position detector detects the positional relationship between the planar portion and the keyboard based on the index value indicating the coupling strength acquired from the keyboard.

* * * * *